US010915916B2

(12) United States Patent
Faith et al.

(10) Patent No.: US 10,915,916 B2
(45) Date of Patent: Feb. 9, 2021

(54) DEVICES, METHODS AND COMPUTER-READABLE MEDIA FOR REDEMPTION OF MERCHANT OFFERS

(71) Applicant: RetailMeNot, Inc., Austin, TX (US)

(72) Inventors: John Newman Faith, Austin, TX (US); Jagjit Singh Bath, Austin, TX (US); Eithan Zilkha, Austin, TX (US); Cameron Kent Savage, Austin, TX (US); David John Reese, Austin, TX (US); James Damon Trim, Pflugerville, TX (US)

(73) Assignee: RETAILMENOT, INC., Austin, TX (US)

( * ) Notice: Subject to any disclaimer, the term of this patent is extended or adjusted under 35 U.S.C. 154(b) by 0 days.

(21) Appl. No.: 16/595,283

(22) Filed: Oct. 7, 2019

(65) Prior Publication Data

US 2020/0034864 A1    Jan. 30, 2020

Related U.S. Application Data

(63) Continuation of application No. 13/840,237, filed on Mar. 15, 2013, now abandoned.
(Continued)

(51) Int. Cl.
*G06Q 30/02* (2012.01)
*H04L 29/08* (2006.01)

(52) U.S. Cl.
CPC ......... *G06Q 30/0222* (2013.01); *G06Q 30/02* (2013.01); *G06Q 30/0225* (2013.01);
(Continued)

(58) Field of Classification Search
CPC ............... G06Q 30/02; G06Q 30/0225; G06Q 30/0239; G06Q 30/0242; G06Q 30/0255;
(Continued)

(56) References Cited

U.S. PATENT DOCUMENTS

2008/0065490 A1*   3/2008   Novick ............... G06Q 20/204
                                                  705/14.26
2008/0255889 A1*  10/2008   Geisler ................ G06Q 10/02
                                                  705/5
(Continued)

OTHER PUBLICATIONS

Notice of Allowance in related U.S. Appl. No. 14/199,588 dated Jun. 18, 2020 (9 pages).
(Continued)

*Primary Examiner* — Azam A Ansari
*Assistant Examiner* — Robert C Johnson
(74) *Attorney, Agent, or Firm* — Womble Bond Dickinson (US) LLP

(57) ABSTRACT

Devices, computer-implemented methods, and computer-readable media for the redemption of merchant offers, such as online coupons, are provided. In some embodiments, online coupons may be provided in a native application of a mobile user device. When a user selects to use an online coupon, a coupon code box having a coupon code associated with the selected coupon may visually move from a first location to a second location of the native application, and a merchant website may be displayed in the native application. Additionally, in some embodiments, a user may drag-and-drop a coupon code box to an input field of a merchant webpage. Movement of a visual copy of the coupon code box may be animated along the drag path. Upon a drop of the coupon code box, a value of the coupon code may be entered into the input field.

20 Claims, 15 Drawing Sheets

Related U.S. Application Data

(60) Provisional application No. 61/707,527, filed on Sep. 28, 2012, provisional application No. 61/665,740, filed on Jun. 28, 2012, provisional application No. 61/658,408, filed on Jun. 12, 2012, provisional application No. 61/658,404, filed on Jun. 11, 2012, provisional application No. 61/658,387, filed on Jun. 11, 2012.

(52) U.S. Cl.
CPC ..... *G06Q 30/0239* (2013.01); *G06Q 30/0242* (2013.01); *G06Q 30/0255* (2013.01); *G06Q 30/0256* (2013.01); *G06Q 30/0267* (2013.01); *G06Q 30/0269* (2013.01); *H04L 67/02* (2013.01)

(58) Field of Classification Search
CPC ........... G06Q 30/0256; G06Q 30/0267; G06Q 30/0269; H04L 67/02
See application file for complete search history.

(56) References Cited

U.S. PATENT DOCUMENTS

| | | | |
|---|---|---|---|
| 2009/0030794 A1 | 1/2009 | Scheflan et al. | |
| 2009/0178008 A1* | 7/2009 | Herz | G06F 3/048 715/840 |
| 2009/0198580 A1* | 8/2009 | Broberg | G06Q 30/0207 705/14.1 |
| 2009/0276701 A1* | 11/2009 | Nurmi | G06F 3/0238 715/702 |
| 2010/0121710 A1 | 5/2010 | Chipman et al. | |
| 2010/0211441 A1* | 8/2010 | Sprigg | G06Q 30/02 705/14.1 |
| 2011/0153401 A1 | 6/2011 | Jellema et al. | |
| 2011/0213652 A1* | 9/2011 | Gillen | G06Q 20/045 705/14.26 |
| 2011/0265043 A1* | 10/2011 | Knitowski | G06F 3/04812 715/835 |

OTHER PUBLICATIONS

Partridge, Kurt and Bo Begole, "Pervasive Advertising; Chapter 4." Jul. 23, 2011, https://link.springer.com/content/pdf/10.1007%F978-0-85729-352-7_4.pdf (19 pages).
Office action in related Canadian application No. 2,876,007 dated Jun. 10, 2020 (4 pages).
Canadian Office Action dated Feb. 27, 2020 in Canadian Application No. 2,876,006 (6 pages).
Webarchive of CouponsHelper Tutorial https://web.archive.org/web/20120421032445/http://www.youtube.com/watch?v=SrYCmKdvzE4 Dec. 12, 2014 (4 pages).
Webarchive of CouponsHelper Firefox Addon https://web.archive.org/web/20120503055113/https://addons.mozilla.org/en-US/firefox/addon/couponshelper/, May 3, 2012 (6 pages).
CouponsHelper—Free Firefox Add on for Coupon Codes https://www.youtube.com/watch?v=TIL_44HRpk8, Jul. 11, 2011 (3 pages).

* cited by examiner

DEVICES, METHODS AND COMPUTER-READABLE MEDIA FOR REDEMPTION OF MERCHANT OFFERS

CROSS-REFERENCE TO RELATED APPLICATIONS

The present application is a continuation of U.S. non-provisional application Ser. No. 13/840,237 filed Mar. 15, 2013, which is a non-provisional of, and thus claims the benefit of, each of the following U.S. provisional patent applications: provisional application 61/707,527, filed Sep. 28, 2012; provisional application 61/665,740, filed Jun. 28, 2012; provisional application 61/658,408, filed Jun. 12, 2012; provisional application 61/658,404, filed Jun. 11, 2012; and provisional application 61/658,387, filed Jun. 11, 2012, the entire contents of each aforementioned application is hereby incorporated by reference herein.

BACKGROUND OF THE INVENTION

1. Field of the Invention

This invention relates generally to merchant offers for goods and services and, more particularly, to redemption of certain offers such as online coupons.

2. Description of the Related Art

Offer-discovery systems provide a service by which merchants inform customers of offers, for example deals (e.g., discounts, favorable shipping terms, or rebates) or coupons (e.g., printable coupons for in-store use or coupon codes for use online). Typically, the systems store information about offers from a relatively large number of merchants and provide an interface by which customers can identify offers in which the customer is likely to be interested. Merchants have found the offer-discovery systems to be a relatively effective form of marketing, as cost-sensitive consumers are drawn to such systems due to their relatively comprehensive listings of offers. Such offers may include coupons, such as include traditional in-store coupons, and online coupons typically obtained via the Internet, such as from merchant websites, e-mail distributions, etc. To use an online coupon, a customer typically provides an identifier, such as a coupon code, when purchasing goods and services from a merchant's online store. However, a customer may forget about the existence of the coupon and, as a result, fail to take advantage of the offer presented by the coupon. Additionally, it may be challenging for a customer to remember the identifier presented by the coupon and to use the online coupon in the manner specified by the online store. And, the advent of smaller computing devices having different or limited interfaces may increase the challenges faces by customers attempting to use online coupons.

SUMMARY OF THE INVENTION

Various embodiments of devices, computer-implemented methods, and computer-readable media for redemption of merchant offers are provided herein. Applicants recognize the need for improved techniques for redemption of merchant offers such as online coupons to reduce or eliminate the burdens on a user. Thus, Applicants recognize users may be unable to remember the existence of a merchant offer, such as coupon, or memorize the information necessary to use the merchant offer. Embodiments address some or all of these recognized needs, but embodiments are not limited to just those systems that address these needs, as various engineering and cost tradeoffs are envisioned and some embodiments address other needs.

In some embodiments, a computer-implemented method is provided that includes providing an online coupon in a native application for the mobile user device, the online coupon having a coupon code in a user interface element located at first location defined by a first set of coordinates of a touchscreen of the mobile user device. The computer-implemented method further includes receiving a selection to use the online coupon for a transaction with a merchant and providing in the user interface a webpage associated with the merchant. The computer-implemented method also includes executing, with a processor of the mobile user device, a visual movement of the user interface element from the first location to a second location, the second location defined by a second set of coordinate of the touchscreen of the mobile user devices.

In other embodiments, a non-transitory computer-readable medium having executable computer code stored thereon is provided. The executable computer code includes instructions that, when executed, cause one or more processors to perform the following: providing an online coupon in a native application for the mobile user device, the online coupon having a coupon code within a user interface element located at first location defined by a first set of coordinates of a touchscreen of the mobile user device. The executable computer further includes instructions that cause one or more processors to perform the following: receiving a selection to use the online coupon for a transaction with a merchant and providing in the user interface a webpage associated with the merchant. Additionally, the executable computer further includes instructions that cause one or more processors to perform the following: executing, with a processor of the mobile user device, a visual movement of the user interface element from the first location to a second location, the second location defined by a second set of coordinate of the touchscreen of the mobile user devices.

Additionally, in some embodiments, a mobile user device is provided that includes a processor, a touchscreen communicatively coupled to the processor, and a non-transitory tangible computer-readable memory communicatively coupled to the processor. The memory has executable computer code stored thereon, the executable computer having instructions that, when executed, cause one or more processors to perform the following: providing an online coupon in a native application for the mobile user device, the online coupon having a coupon code within a user interface element located at first location defined by a first set of coordinates of a touchscreen of the mobile user device. The executable computer further includes instructions that cause one or more processors to perform the following: receiving a selection to use the online coupon for a transaction with a merchant and providing in the user interface a webpage associated with the merchant. Additionally, the executable computer further includes instructions that cause one or more processors to perform the following: executing, with a processor of the mobile user device, a visual movement of the user interface element from the first location to a second location, the second location defined by a second set of coordinate of the touchscreen of the mobile user devices.

Additionally, in some embodiments, a computer-implemented method is provided that includes providing a coupon code associated with a merchant in a native application for the mobile user device, the coupon code in a user interface element located at a first location defined by a first set of coordinates of a touchscreen of the mobile user device and providing (e.g., requesting and rendering) in the native application a webpage associated with the merchant, the webpage having an input field for receiving user input associated with a coupon, the input field located at a second location at a second set of coordinates of the touchscreen. The computer-implemented method further includes receiving a touch on the touchscreen at the first location and receiving a gesture on the touchscreen, the gesture including a movement from the first location to the second location. The computer-implemented method also includes executing, with a processor of the mobile user device, a visual movement of the user interface element having the coupon code from the first location to the second location along a path coincident with the gesture, receiving a release of the touch at the second location, and setting, the value of the input field of the webpage to text corresponding to the coupon code.

In other embodiments, a non-transitory computer-readable medium having executable computer code stored thereon is provided. The executable computer includes instructions that, when executed, cause one or more processors to perform the following: providing a coupon code associated with a merchant in a native application for the mobile user device, the coupon code in a user interface element located at a first location defined by a first set of coordinates of a touchscreen of the mobile user device and providing in the native application a webpage associated with the merchant, the webpage having an input field for receiving user input associated with a coupon, the input field located at a second location at a second set of coordinates of the touchscreen. The executable computer further includes instructions that cause one or more processors to perform the following: receiving a touch on the touchscreen at the first location and receiving a gesture on the touchscreen, the gesture including a movement from the first location to the second location. The executable computer further also instructions that cause one or more processors to perform the following: executing, with a processor of the mobile user device, a visual movement of the user interface element having the coupon code from the first location to the second location along a path coincident with the gesture, receiving a release of the touch at the second location, and setting the value of the input field of the webpage to text corresponding to the coupon code.

Additionally, in some embodiments, a mobile user device is provided that includes a processor, a touchscreen communicatively coupled to the processor, and a non-transitory tangible computer-readable memory communicatively coupled to the processor. The memory has executable computer code stored thereon, the executable computer having instructions that, when executed, cause one or more processors to perform the following: providing a coupon code associated with a merchant in a native application for the mobile user device, the coupon code in a user interface element located at a first location defined by a first set of coordinates of a touchscreen of the mobile user device and providing in the native application a webpage associated with the merchant, the webpage having an input field for receiving user input associated with a coupon, the input field located at a second location at a second set of coordinates of the touchscreen. The executable computer code further includes instructions that cause one or more processors to perform the following: receiving a touch on the touchscreen at the first location and receiving a gesture on the touchscreen, the gesture including a movement from the first location to the second location. The executable computer further also instructions that cause one or more processors to perform the following: executing, with a processor of the mobile user device, a visual movement of the user interface element having the coupon code from the first location to the second location along a path coincident with the gesture, receiving a release of the touch at the second location, and setting the value of the input field of the webpage to text corresponding to the coupon code.

Finally, in some embodiments, a computer-implemented method is provided that includes providing a coupon in a native application for the mobile user device, the coupon having a coupon code in a user interface element located at first location defined by a first set of coordinates of a touchscreen of the mobile user device and receiving a selection to use the coupon for a transaction with a merchant. Additionally, the computer-implemented method includes providing a webpage associated with the merchant in the application and providing, with a processor of the mobile user device, the coupon code in the user interface element at a second location defined by a second set of coordinates of the touchscreen, the second set of coordinates located at a header portion of a display of the application, wherein the header portion is positioned vertically above the webpage.

Figure 1:
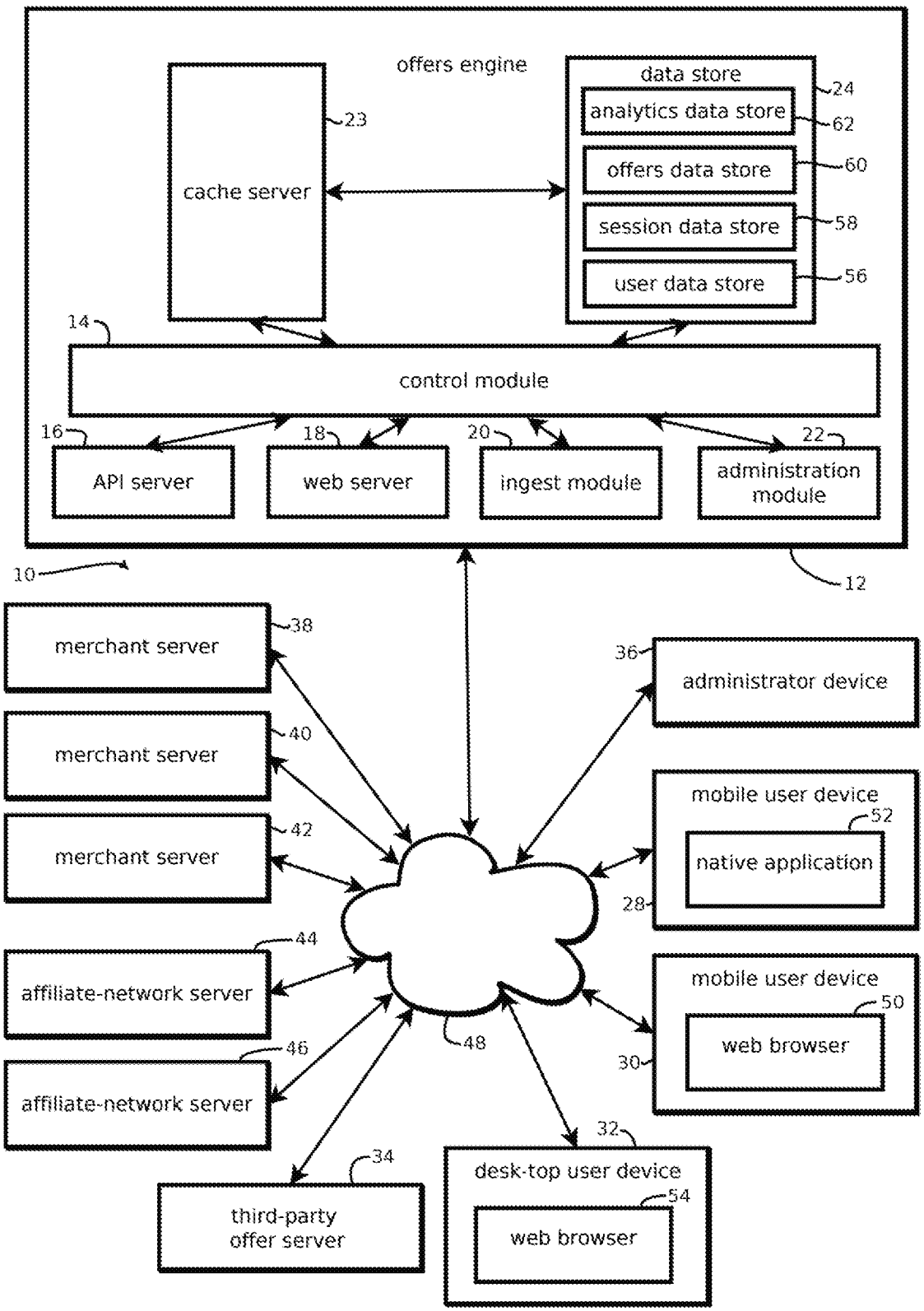
FIG. 1 illustrates an example of an offer-discovery system in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

FIG. 1 shows an embodiment of an offer-discovery system 10. The exemplary system 10 includes an offers engine 12 that, in some embodiments, is capable of reducing the burden on users attempting to identify offers relevant to them from among a relatively large pool of offers (e.g., more than 100, more than 1,000, or more than 10,000). To this end and others, the offers engine 12 maintains device-independent user profiles (or portions of user profiles) by which offers interfaces may be relatively consistently configured across multiple user devices with which the user interacts with the offers engine 12. Further, the offers engine 12, in some embodiments, includes a number of features expected to facilitate relatively quick identification of relevant offers by a user, features that include cached storage of data related to likely relevant offers, faceted presentation of offers by which users can select among offers within various categories, and a number of other techniques described below for assisting with offer identification. The offers engine 12 is also expected to facilitate relatively low operating costs by, in some embodiments, automating parts of the process by which offer related data is acquired from sources, such as affiliate networks merchants, administrators, or users, and automating parts of the process by which transaction data indicative of acceptance, settlement, or clearing of offers is obtained and processed.

These and other benefits are described in greater detail below, after introducing the components of the system 10 and describing their operation. It should be noted, however, that not all embodiments necessarily provide all of the benefits outlined herein, and some embodiments may provide all or a subset of these benefits or different benefits, as various engineering and cost tradeoffs are envisioned.

In the illustrated embodiment, the offers engine 12 includes a control module 14, an application program interface (API) server 16, a web server 18, an ingest module 20, an administration module 22, a data store 24, and a cache server 23. These components, in some embodiments, communicate with one another in order to provide the functionality of the offers engine 12 described herein. As described in greater detail below, in some embodiments, the data store 24 may store data about offers and users' interactions with those offers; the cache server 23 may expedite access to this data by storing likely relevant data in relatively high-speed memory, for example, in random-access memory or a solid-state drive; the web server 20 may serve webpages having offers interfaces by which users discover relevant offers; the API server 16 may serve data to various applications that process data related to offers; the ingest module 20 may facilitate the intake of data related to offers from affiliate networks, users, administrators, and merchants; and the administration module 22 may facilitate curation of offers presented by the API server 16 and the web server 18. The operation of these components 16, 18, 20, 22, 24, and 23 may be coordinated by the control module 14, which may bidirectionally communicate with each of these components or direct the components to communicate with one another. Communication may occur by transmitting data between separate computing devices (e.g., via transmission control protocol/internet protocol (TCP/IP) communication over a network), by transmitting data between separate applications or processes on one computing device; or by passing values to and from functions, modules, or objects within an application or process, e.g., by reference or by value.

Among other operations, the offers engine 12 of this embodiment presents offers to users; receives data from users about their interaction with the offers (for example, the user's favorite offers or offer attributes; statistics about the offers the user has identified, accepted, or otherwise provided data about; or the identity of other users with whom the user communicates about offers and the content of those communications; provided that users opt to have such data obtained); customizes the presentation of offers based on this received data; and facilitates the processing of compensation from merchants (either directly or through affiliate networks) as a result of users accepting (or taking a specific action, like clicking or viewing, in some embodiments or use cases) offers. This interaction with users may occur via a website viewed on a desktop computer, tablet, or a laptop of the user. And in some cases, such interaction occurs via a mobile website viewed on a smart phone, tablet, or other mobile user device, or via a special-purpose native application executing on a smart phone, tablet, or other mobile user device. Presenting and facilitating interaction with offers across a variety of devices is expected to make it easier for users to identify and recall relevant offers at the time the user is interested in those offers, which is often different from the time at which the user first discovers the offers. In particular, some embodiments allow users to store data indicative of offers relevant to that user using one device, such as a desktop computer in the user's home, and then view those offers at a later time, such as on a native mobile application when in a retail store.

To illustrate an example of the environment in which the offers engine 12 operates, the illustrated embodiment of FIG. 1 includes a number of components with which the offers engine 12 communicates: mobile user devices 28 and 30; a desk-top user device 32; a third party server 34; an administrator device 36; merchant servers 38, 40, and 42; and affiliate-network servers 44 and 46. Each of these devices communicates with the offers engine 12 via a network 48, such as the Internet or the Internet in combination with various other networks, like local area networks, cellular networks, or personal area networks.

The mobile user devices 28 and 30 may be smart phones, tablets, gaming devices, or other hand-held networked computing devices having a display, a user input device (e.g., buttons, keys, voice recognition, or a single or multi-touch touchscreen), memory (such as a tangible, machine-readable, non-transitory memory), a network interface, a portable energy source (e.g., a battery), and a processor (a term which, as used herein, includes one or more processors) coupled to each of these components. The memory of the mobile user devices 28 and 30 may store instructions that when executed by the associated processor provide an operating system and various applications, including a web browser 50 or a native mobile application 52. The native application 52, in some embodiments, is operative to provide an offers interface that communicates with the offers engine 12 and facilitates user interaction with data from the offers engine 12. Similarly, the web browser 50 may be configured to receive a website from the offers engine 12 having data related to deals and instructions (for example, instructions expressed in JavaScript™) that when executed by the browser (which is executed by the processor) cause the mobile user device to communicate with the offers engine 12 and facilitate user interaction with data from the offers engine 12. The native application 52 and the web browser 50, upon rendering a webpage from the offers engine 12, may generally be referred to as client applications of the offers engine 12, which in some embodiments may be referred to as a server. Embodiments, however, are not limited to client/server architectures, and the offers engine 12, as illustrated, may include a variety of components other than those functioning primarily as a server.

The desk-top user device 32 may also include a web browser 54 that serves the same or similar role as the web browser 50 in the mobile user device 30. In addition, the desk-top user device 32 may include a monitor; a keyboard; a mouse; memory; a processor; and a tangible, non-transitory, machine-readable memory storing instructions that when executed by the processor provide an operating system and the web browser.

Third-party offer server 34 may be configured to embed data from the offers engine 12 in websites or other services provided by the third-party offer server 34. For example, third-party offer server 34 may be a server of a social networking service upon which users post comments or statistics about offers with which the user has interacted, or the users may use the offer server 34 to recommend offers to others or identify offers to avoid. In another example, third-party offer server 34 may include various services for publishing content to the Web, such as blogs, tweets, likes, dislikes, ratings, and the like. In another example, third-party offer server 34 provides services by which third-parties curate offers hosted by the offers engine 12.

Merchant servers 38, 40, and 42 host websites or other user accessible content interfaces by which users can accept offers hosted by the offers engine 12. In some embodiments, and in some use cases, the merchant servers 38, 40, and 42 host retail websites that present a plurality of items for sale by the merchant, a subset of which may include items to which offers apply, thereby generally making the item for sale more desirable to cost-sensitive consumers than under the terms presented by the merchant in the absence of the offer. For example, the offers may include free or discounted shipping, a discounted price, a bulk discount, a rebate, a referral award, or a coupon, such as a coupon acceptable by presenting a coupon code during checkout on the merchant website, or a printable or displayable coupon (e.g., on the screen of a mobile device) for in-store use, the printable or otherwise displayable coupon having, in some cases, a machine readable code (e.g., a bar code or QR code for display and scanning, or a code passed via near-field communication or Bluetooth™). In some embodiments, the merchant website includes a checkout webpage having an interface for the user to enter payment information and a coupon code, and the merchant website (either with logic on the client side or the server-side) may validate the coupon code entered by the user and, upon determining that the coupon code is valid, adjust the terms presented to the user for acceptance in accordance with the offer.

Some merchants may limit the number of uses of a given coupon, limit the duration over which the coupon is valid, or apply other conditions to use of the coupon, each of which may add to the burden faced by users seeking to find valid coupons applicable to an item the user wishes to purchase. As noted above, some embodiments of the offers engine 12 are expected to mitigate this burden.

Further, in some embodiments, the merchant servers 38, 40, and 42 provide data about offers to the offers engine 12 or (i.e., and/or, as used herein, unless otherwise indicated) data about transactions involving offers. In use cases in which the operator of the offers engine 12 has a direct affiliate-marketing relationship with one of the merchants of the merchant servers 38, 40, or 42, the transaction data may provide the basis for payments by the merchant directly to the operator of the offers engine 12. For example, payments may be based on a percentage of transactions to which offers were applied, a number of sales to which offers were applied, or a number of users who viewed or selected or otherwise interacted with an offer by the merchant.

Affiliate-network servers 44 and 46, in some embodiments and some use cases, are engaged when the entity operating the offers engine 12 does not have a direct affiliate-marketing relationship with the merchant making a given offer. In many affiliate marketing programs, merchants compensate outside entities, such as third-party publishers, for certain activities related to sales by that merchant and spurred by the outside entity. For example, in some affiliate marketing programs, merchants compensate an affiliate, such as the entity operating the offers engine 12, in cases in which it can be shown that the affiliate provided a given coupon code to a given user who then used that coupon code in a transaction with the merchant. Demonstrating this connection to the merchant is one of the functions of the affiliate-networks.

Affiliate-networks are used, in some use cases, because many coupon codes are not affiliate specific and are shared across multiple affiliates, as the merchant often desires the widest distribution of a relatively easily remembered coupon code. Accordingly, in some use cases, the merchant, affiliate network, and affiliate cooperate to use client-side storage to indicate the identity of the affiliate that provided a given coupon code to a user. To this end, in some embodiments, when a webpage offers interface is presented by the offers engine 12 in the web browsers 50 or 54, that webpage is configured by the offers engine 12 to include instructions to engage the affiliate network server 44 or 46 when a user selects an offer, for example, by clicking on, touching, or otherwise registering a selection of an offer. The website provided by the offers engine 12 responds to such a selection by, in some embodiments, transmitting a request to the appropriate affiliate-network server 44 or 46 (as identified by, for example, an associated uniform resource locator (URL) in the webpage) for a webpage or portion of a webpage (e.g., browser-executable content). The request to the affiliate-network server may include (e.g., as parameters of the URL) an identifier of the affiliate, the offer, and the merchant, and the returned content from the affiliate-network server may include instructions for the web browser 50 or 54 to store in memory (e.g., in a cookie, or other form of browser-accessible memory, such as a SQLite database or in a localStorage object via a localStorage.setItem command) an identifier of the affiliate that provided the offer that was selected.

The webpage from the offers engine 12 (or the content returned by the affiliate network server 44 or 46) may further include browser instructions to navigate to the website served by the merchant server 38, 40, or 42 of the merchant associated with the offer selected by the user, and in some cases to the webpage of the item or service associated with the offer selected by the user. When a user applies the offer, for example by purchasing the item or service or purchasing the item or service with the coupon code, the merchant server 38, 40, or 42 may transmit to the user device upon which the item was purchased browser instructions to request content from the affiliate network server 44 or 46, and this requested content may retrieve from the client-side memory the identifier of the affiliate, such as the operator of the offers engine 12, who provided the information about the offer to the user. The affiliate network may then report to the merchant the identity of the affiliate who should be credited with the transaction, and the merchant may compensate the affiliate (or the affiliate network may bill the merchant, and the affiliate network may compensate the affiliate), such as the operator of the offers engine 12. Thus, the affiliate network in this example acts as an intermediary, potentially avoiding the need for cross-domain access to browser memory on the client device, a feature which is generally not supported by web browsers for security reasons. (Some embodiments may, however, store in client-side browser-accessible memory an identifier of the affiliate upon user selection of the offer, with this value designated as being accessible via the merchant's domain, and provide the value to the merchant upon a merchant request following acceptance of the offer, without passing the identifier through an affiliate network, using a browser plug-in for providing cross-domain access to browser memory or a browser otherwise configured to provide such access.)

A similar mechanism may be used by the native application 52 for obtaining compensation from merchants. In some embodiments, the native application 52 includes or is capable of instantiating a web browser, like the web browser 50, in response to a user selecting an offer presented by the native application 52. The web browser instantiated by the native application 52 may be initialized by submitting the above-mentioned request for content to the affiliate-network server 44 or 46, thereby storing an identifier of the affiliate (i.e., the entity operating the offers engine 12 in this example) in client-side storage (e.g., in a cookie, localStorage object, or a database) of the mobile user device 28, and thereby navigating that browser to the merchant website. In other use cases, the operator of the offers engine 12 has a direct relationship with the merchant issuing the offer, and the selection of an offer within the native application 52 or the desktop or mobile website of the offers engine 12 (generally referred to herein as examples of an offer interface) may cause the user device to request a website from the associated merchant with an identifier of the affiliate included in the request, for example as a parameter of a URL transmitted in a GET request to the merchant server 38, 40, or 42 for the merchant's website.

Administrator device 36 may be a special-purpose application or a web-based application operable to administer operation of the offers engine 12, e.g., during use by employees or agents of the entity operating the offers engine 12. In some embodiments, the administration module 22 may communicate with the administrator device 36 to present an administration interface at the administrator device 36 by which an administrator may configure offers interfaces presented to users by the offers engine 12. In some embodiments, the administrator may enter offers into the offers engine 12; delete offers from the offers engine 12; identify offers for prominent placement within the offers interface (e.g., for initial presentation prior to user interaction); moderate comments on offers; view statistics on offers, merchants, or users; add content to enhance the presentation of offers; or categorize offers.

Thus, the offers engine 12, in some embodiments, operates in the illustrated environment by communicating with a number of different devices and transmitting instructions to various devices to communicate with one another. The number of illustrated merchant servers, affiliate network servers, third-party servers, user devices, and administrator devices is selected for explanatory purposes only, and embodiments are not limited to the specific number of any such devices illustrated by FIG. 1.

The offers engine 12 of some embodiments includes a number of components introduced above that facilitate the discovery of offers by users. For example, the illustrated API server 16 may be configured to communicate data about offers via an offers protocol, such as a representational-state-transfer (REST)-based API protocol over hypertext transfer protocol (HTTP). Examples of services that may be exposed by the API server 18 include requests to modify, add, or retrieve portions or all of user profiles, offers, or comments about offers. API requests may identify which data is to be modified, added, or retrieved by specifying criteria for identifying records, such as queries for retrieving or processing information about particular categories of offers, offers from particular merchants, or data about particular users. In some embodiments, the API server 16 communicates with the native application 52 of the mobile user device 28 or the third-party offer server 34.

The illustrated web server 18 may be configured to receive requests for offers interfaces encoded in a webpage (e.g. a collection of resources to be rendered by the browser and associated plug-ins, including execution of scripts, such as JavaScript™, invoked by the webpage). In some embodiments, the offers interface may include inputs by which the user may request additional data, such as clickable or touchable display regions or display regions for text input. Such inputs may prompt the browser to request additional data from the web server 18 or transmit data to the web server 18, and the web server 18 may respond to such requests by obtaining the requested data and returning it to the user device or acting upon the transmitted data (e.g., storing posted data or executing posted commands). In some embodiments, the requests are for a new webpage or for data upon which client-side scripts will base changes in the webpage, such as XMLHttpRequest requests for data in a serialized format, e.g. JavaScript™ object notation (JSON) or extensible markup language (XML). The web server 18 may communicate with web browsers, such as the web browser 50 or 54 executed by user devices 30 or 32. In some embodiments, the webpage is modified by the web server 18 based on the type of user device, e.g., with a mobile webpage having fewer and smaller images and a narrower width being presented to the mobile user device 30, and a larger, more content rich webpage being presented to the desk-top user device 32. An identifier of the type of user device, either mobile or non-mobile, for example, may be encoded in the request for the webpage by the web browser (e.g., as a user agent type in an HTTP header associated with a GET request), and the web server 18 may select the appropriate offers interface based on this embedded identifier, thereby providing an offers interface appropriately configured for the specific user device in use.

The illustrated ingest module 20 may be configured to receive data about new offers (e.g., offers that are potentially not presently stored in the data store 24), such as data feeds from the affiliate network servers 44 and 46, identifications of offers from user devices 28, 30, or 32, offers identified by third-party offer server 34, offers identified by merchant servers 38, 40, or 42, or offers entered by an administrator via the administrator device 36. In some embodiments, the ingest module 20 may respond to receipt of a record identifying a potentially new offer by querying the data store 24 to determine whether the offer is presently stored. Upon determining that the offer is not presently stored by the data store 24, the ingest module 20 may transmit a request to the data store 24 to store the record. In some cases, the data about new offers may be an affiliate data-feed from an affiliate network containing a plurality of offer records (e.g., more than 100), each record identifying offer terms, a merchant, a URL of the merchant associated with the offer, a product description, and an offer identifier. The ingest module 22 may periodically query such data-feeds from the affiliate-network servers 44 or 46, parse the data-feeds, and iterate through (or map each entry to one of a plurality of processes operating in parallel) the records in the data-feeds. Bulk, automated processing of such data-feeds is expected to lower operating costs of the offers engine 12.

The administration module 22 may provide an interface by which an administrator operating the administrator device 36 curates and contextualizes offers. For example, the administration module 22 may receive instructions from administrator that identify offers to be presented in the offer interface prior to user interaction with the offer interface, or offers to be presented in this initialized offers interface for certain categories of users, such as users having certain attributes within their user profile. Further, in some embodiments, the administration module 22 may receive data descriptive of offers from the administrator, such as URLs of images relevant to the offer, categorizations of the offer, normalized data about the offer, and the like.

The illustrated data store 24, in some embodiments, stores data about offers and user interactions with those offers. The data store 24 may include various types of data stores, including relational or non-relational databases, document collections, hierarchical key-value pairs, or memory images, for example. In this embodiment, the data store 24 includes a user data store 56, a session data store 58, an offers data store 60, and an analytics data store 62. These data stores 56, 58, 60, and 62 may be stored in a single database, document, or the like, or may be stored in separate data structures.

In this embodiment, the illustrated user data store 56 includes a plurality of records, each record being a user profile and having a user identifier, a list of offers (e.g., identifiers of offers) identified by the user as favorites, a list of categories of offers identified by the user as favorites, a list of merchants identified by the user as favorites, account information for interfacing with other services to which the user subscribes (e.g., a plurality of access records, each record including an identifier of a service, a URL of the service, a user identifier for the service, an OAuth access token credential issued by the service at the user's request, and an expiration time of the credential), a user password for the offers engine 12, a location of the user device or the user (e.g., a zip code of the user), and a gender of the user. In some embodiments, each user profile includes a list of other users identified by the user of the user profile as being people in whose commentary on, or curation of, offers the user is interested, thereby forming an offers-interest graph. In some embodiments, users have control of their data, including what is stored and who can view the data, and can choose to opt-in to the collection and storage of such user data to improve their experience with the offers engine 12.

In this embodiment, the session data store 58 stores a plurality of session records, each record including information about a session a given user is having or has had with the offers engine 12. The session records may specify a session identifier, a user identifier, and state data about the session, including which requests have been received from the user and what data has been transmitted to the user. Session records may also indicate the IP address of the user device, timestamps of exchanges with the user device, and a location of the user device (e.g., retail store or aisle in a retail store in which the user device is located).

The illustrated offers data store 60, in some embodiments, includes a plurality of offer records, each offer record may identify a merchant, offers by that merchant, and attributes of the relationship with the merchant, e.g., whether there is a direct relationship with the merchant by which the merchant directly compensates the operator of the offers engine 12 or whether the merchant compensates the operator of the offers engine 12 via an affiliate network and which affiliate network. The offers by each merchant may be stored in a plurality of merchant-offer records, each merchant-offer record may specify applicable terms and conditions of the offer, e.g., whether the offer is a discount, includes free or discounted shipping, requires purchase of a certain number of items, is a rebate, or is a coupon (which is not to suggest that these designations are mutually exclusive). In records in which the offer is a coupon, the record may further indicate whether the coupon is for in-store use (e.g. whether the coupon is associated with a printable image for presentation at a point-of-sale terminal, a mobile device-displayable image, or other mediums) or whether the coupon is for online use and has a coupon code, in which case the coupon code is also part of the merchant-offer record. The merchant-offer records may also include an expiration date of the offer, comments on the offer, rankings of the offer by users, a time at which the offer was first issued or entered into the offers engine 12, and values (e.g., binary values) indicating whether users found the offer to be effective, with each value or ranking being associated with a timestamp, in some embodiments. The values and rankings may be used to calculate statistics indicative of the desirability of the offer and likely success of accepting the offer. The timestamps associated with the values, rankings, and time of issuance or entry into the offers engine 12 may also be used to weight rankings of the offer, with older values being assigned less weight than newer values and older offers being ranked lower than newer offers, all other things being equal, as many offers expire or have a limited number of uses.

The illustrated analytics data store 62 may store a plurality of records about historical interactions with the offers engine 12, such as aggregate statistics about the performance of various offers. In some embodiments, the analytics data store 62 stores a plurality of transaction records, each transaction record identifying an offer that was accepted by a user at a merchant, the merchant, the time of presentation of the offer to the user, and an indicator of whether the merchant has compensated the entity operating the offers engine 12 for presentation of the offer to the user. Storing and auditing these transaction records is expected to facilitate relatively accurate collection of payments owed by merchants and identification of future offers likely to lead to a relatively high rates of compensation for prominent presentation based on past performance of offers having similar attributes.

The cache server 23 stores a subset of the data in the data store 24 that is among the more likely data to be accessed in the near future. To facilitate relatively fast access, the cache server 23 may store cached data in relatively high speed memory, such as random access memory or a solid-state drive. The cached data may include offers entered into the offers engine 12 within a threshold period of time, such as offers that are newer than one day. In another example, the cache data may include offers that are accessed with greater than a threshold frequency, such as offers that are accessed more than once a day, or offers accessed within the threshold, such as offers accessed within the previous day. Caching such offer data is expected to facilitate faster access to offer data than systems that do not cache offer data.

The illustrated control module 14, in some embodiments, controls the operation of the other components of the offers engine 12, receiving requests for data or requests to add or modify data from the API server 16, the web server 18, the ingest module 20, and the administration module 22, and instructing the data store 24 to modify, retrieve, or add data in accordance with the request. The control module 14 may further instruct the cache server 23 to modify data mirrored in the cache server 23. In some embodiments, the cache server 23 may be updated hourly, and inconsistent data may potentially be maintained in the cache server 23 in order to conserve computing resources.

The illustrated components of the offers engine 12 are depicted as discrete functional blocks, but embodiments are not limited to systems in which the functionality described herein is organized as illustrated by FIG. 1. The functionality provided by each of the components of the offers engine 12 may be provided by software or hardware modules that are differently organized than is presently depicted, for example such software or hardware may be intermingled, broken up, distributed (e.g. within a data center or geographically), or otherwise differently organized. The functionality described herein may be provided by one or more processors of one or more computers executing code stored on a tangible, non-transitory, machine readable medium.

Figure 2:
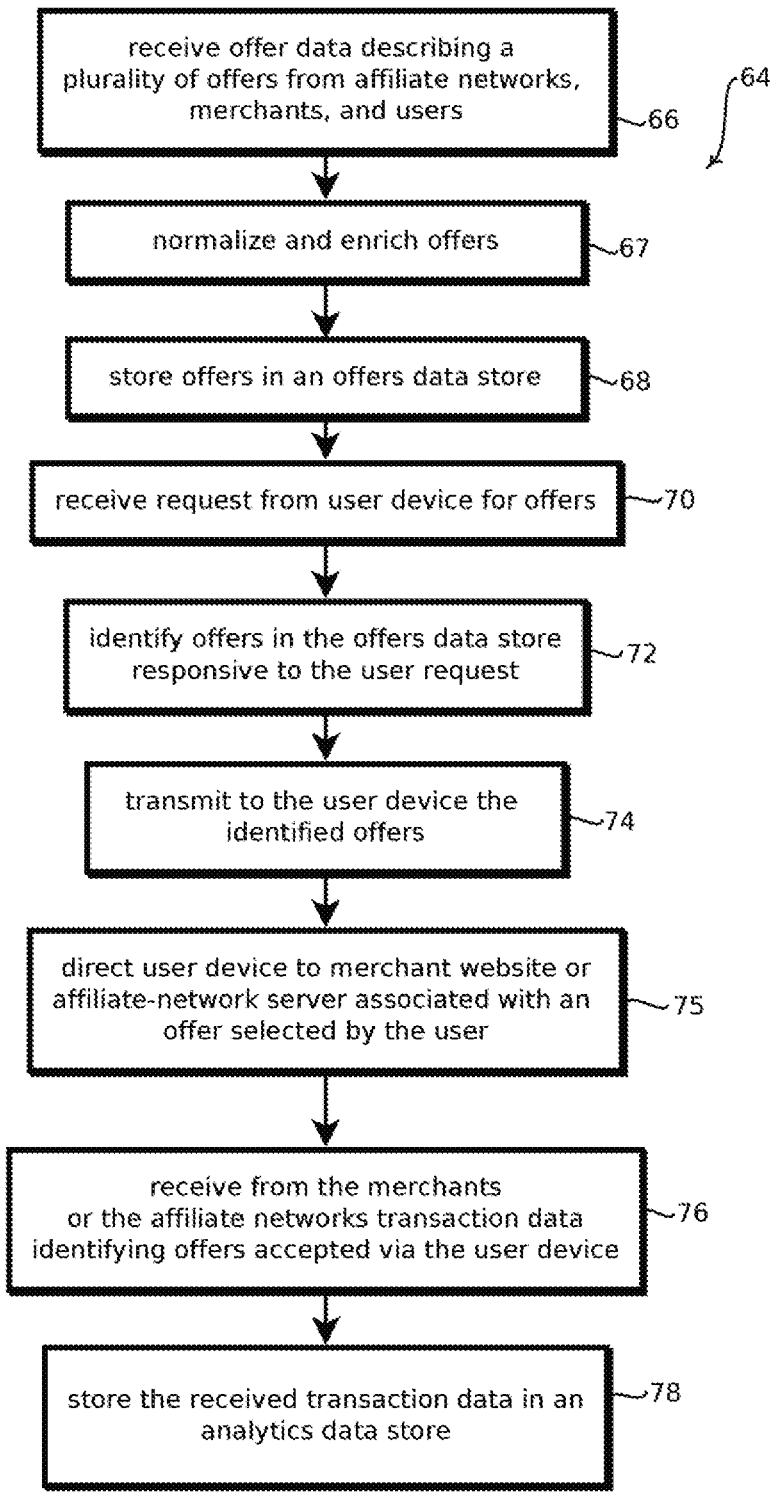
FIG. 2 illustrates an example of a process by which an offers engine in the offer-discovery system of FIG. 1, in some embodiments, obtains and processes data related to offers.

FIG. 2 is a flowchart of a process 64 for acquiring data related to offers within some embodiments of the offer engine 12 discussed above. In this embodiment, the process 64 begins with receiving offer data describing a plurality of offers from affiliate networks, merchants, and users, as illustrated by block 66. This step may be performed by the above-mentioned ingest module 20. As noted above, the received offer data may be received from one or all of these sources. The received offer data may be received via an offer interface by which users associated with these sources enter data about offers, or the received offer data may be received in a predefined format, such as a serialized data format, in an automatic data feed pushed or pulled periodically or in response to the availability of new data from affiliate networks or merchants. Receiving the offer data may include determining whether the offer data is redundant to offer data already received and normalizing the offer data.

The process 64, in some embodiments, includes normalizing and enriching the offer data. Normalizing may include normalizing field names of the data and normalizing the way in which dates are expressed, for example. Enriching may include associating images with the offers for presentation with the offers and adding metadata to the offers to assist users searching for offers.

Next, in the present embodiment, the received offer data is stored in an offer data store, as indicated by block 68. Storing the offer data in the offer data store may include identifying a merchant to which the offer pertains and storing the offer in a merchant-offer record associated with that merchant. Further, some embodiments may include inserting the offer in order in a sorted list of offers for relatively fast retrieval of offers using a binary search algorithm or other techniques to facilitate relatively quick access to data that has been preprocessed (e.g., using a prefix trie). In some embodiments, storing the received offer may further include updating hash tables by which the offer may be retrieved according to various parameters, each hash table being associated with one parameter and including a hash key value calculated based on the parameter and paired with an address of the offer. Such hash tables are expected to facilitate relatively fast access to a given offer as the need to iterate through potentially all offers meeting certain criteria may be potentially avoided.

In some embodiments, the process 64 further includes receiving a request from a user device for offers, as indicated by block 70. The request may specify criteria for identifying offers, such as categories of offers, search terms for offers, or requests for offers designated as favorites.

Next, the present embodiment includes identifying offers in the offer data store responsive to the user request, as indicated by block 72. Identifying offers in the offer data store may be performed by the above-mentioned controller 14 (FIG. 1) by constructing a query to the offer data store 60 based on a request received from the web server 18 or the API server 16. The query may be transmitted to the offer data store 60, or to the cache server 23, each of which may return responsive records.

Next, the identified offers are transmitted to the user device, as indicated by block 74. Transmitting the identified offers may include transmitting the identified offers in an offer interface, such as a webpage, or an API transmission to a native mobile application, for example by the web server 18, or the API server 16 of FIG. 1, respectively.

The device receiving the identified offers may, in response, perform a process described below with reference to FIG. 3 by which additional offers are requested or an offer is selected and a purchase is executed. This process of FIG. 3 and steps 70 through 74 of FIG. 2 may be repeated numerous times, in some use cases, before advancing to the next steps. Further, the steps 66 through 68 may be repeated numerous times independently of (e.g., concurrent with) the performance of steps 70 through 74 of FIG. 2 (which is not to suggest that other steps described herein may not also be executed independently). That is, the process 64 may undergo step 60 and 68, for example, 50 times within a given time, while performing steps 70 through 74 500 times within that given time, and performing the remaining steps of process 64 a single time.

Figure 3:
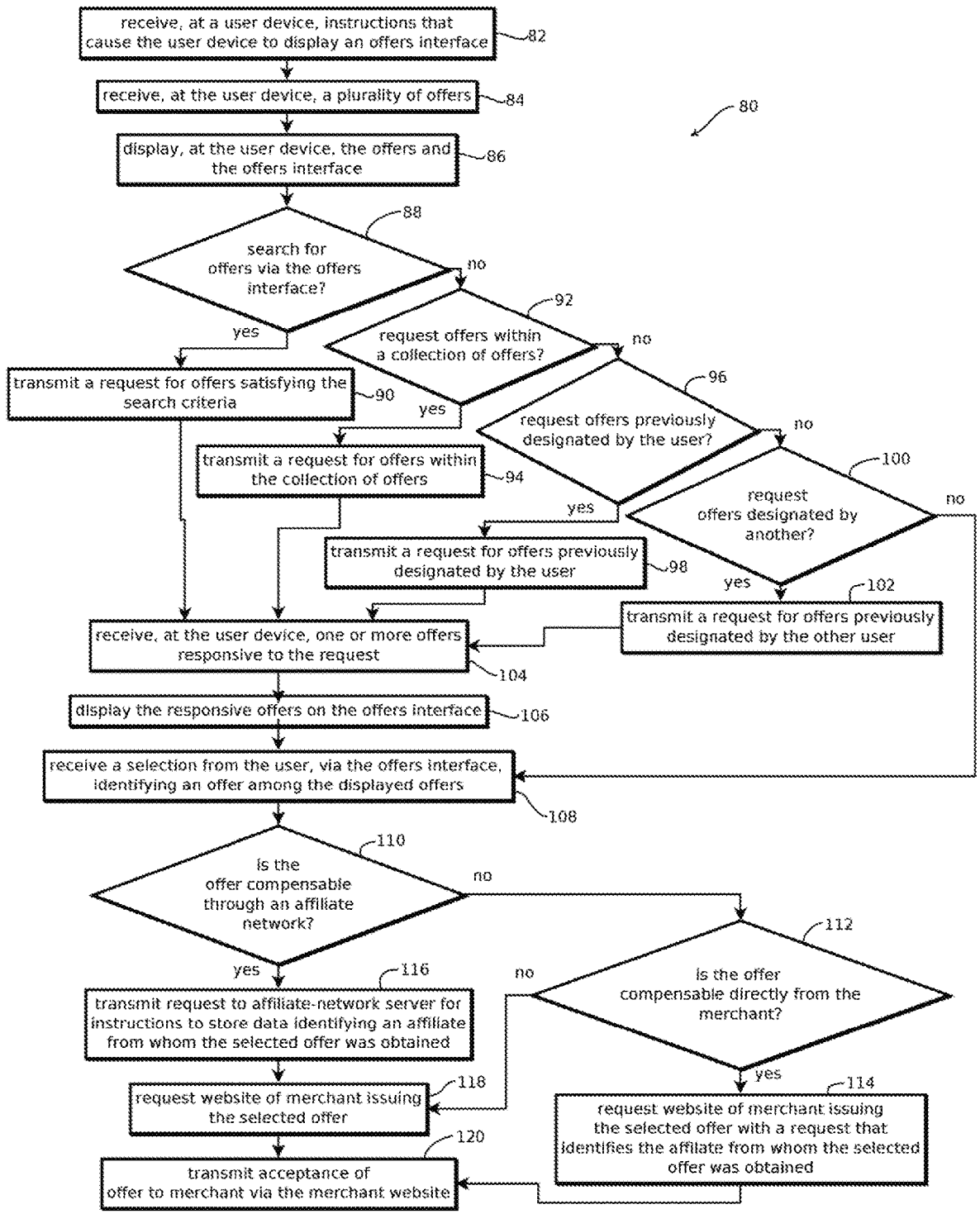
FIG. 3 illustrates an example of a process by which a user device in the offer-discovery system of FIG. 1, in some embodiments, obtains and presents to users data related to offers.

In some embodiments, a user device undergoing the process of FIG. 3 may indicate to an offers engine that the user has selected an offer (e.g., by clicking on or touching a selectable element in an offers interface associated with the offer). In response, the offers engine may direct the user device to an affiliate-network server or a merchant server associated with the offer, as illustrated by block 75.

Next, this embodiment of the process 64 includes receiving from merchants or affiliate networks transaction data identifying offers accepted via the user device, as illustrated by block 76. The transaction data may be pulled from these sources, for example, by the ingest module 20 of FIG. 1, periodically, or in response to some threshold number of transactions having occurred.

Next, in this embodiment, the receipt transaction data may be stored in an analytics data store, as indicated by block 78. In some embodiments, this data may be stored in the analytics data store 62 of FIG. 1. Storing the transaction data is expected to facilitate the identification of attributes of relatively profitable offers, as the transaction data indicates which offers historically yielded compensable transactions. Further, storing the transaction data is expected to facilitate relatively accurate auditing of payments from merchants or affiliate networks.

FIG. 3 is a flowchart of an embodiment of a process 80 that provides an example of an offer interface at a user device. The process 80 may be performed by the above-mentioned native application 52 or web browser 50 or 54 in cooperation with the offers engine 12.

Some embodiments of process 80 begin with receiving, at a user device, instructions that cause the user device to display an offers interface, as indicated by block 82. The received instructions may be in the form of a downloaded native application, such as one downloaded from an application store hosted by a provider of mobile devices, or the received instructions may be in the form of a website received from the offers engine 12 and rendered in a browser of the user device.

In some embodiments, the process 80 further includes receiving, at the user device, a plurality of offers, as indicated by block 84, and displaying, at the user device, the offers in the offer interface, as indicated by block 86. The offers may be received at approximately the same time the instructions of step 82 are received, for example along with a webpage, or the offers may be received at a later date, for example during a session subsequent to downloading the native application.

The offers interface may include inputs by which the user may search, filter, or otherwise browse offers having various attributes. Some of these interfaces are described below with reference to steps performed to determine whether the user has engaged these inputs. In some embodiments, determining whether the user has engaged these inputs may be performed by an event handler executed by the user device, the event handler causing the user device to perform the corresponding, below-described requests to the offers engine 12 based on the type of event, e.g., whether the user touched, clicked, or otherwise selected a particular button on the offers interface.

Illustrated process 80 includes determining whether the user is searching for offers, as indicated by block 88. With the offers interface, the user may express their intention to search for offers by entering search terms in a text entry box and selecting a button to request a search in accordance with the entered search term. Upon selecting this button, the user device may transmit a request for offers satisfying the entered search criteria, as indicated by block 90. The transmitted request may be in the form of a GET request or an API call to the web server 18 or the API server 16 of the offers engine 12 of FIG. 1.

In some embodiments, the process 80 further includes determining whether the user requests offers within a collection of offers, as indicated by block 92. The offers interface may include selectable inputs that identify the collections, such as clickable collection names, collection selection buttons, or collection selection tabs. Examples of collections include categories of goods or services, such as sporting goods, house-wares, groceries, and the like; collections of modes of coupon redemption, such as in-store coupon redemption and online coupon redemption; collections based on offer statistics, such as newest offers, most popular offers, highest ranked offers; collections of offers designated by a user or other users; or collections based the value conferred by the offer, such as discounts, free shipping, rebates, and referral fees. Upon determining that the user has requested offers within a collection, the user device may transmit a request for offers within the collection to the offers engine 12, as indicated by block 94, which may return data responsive to the request.

In some embodiments, the process 80 includes determining whether the user requests offers previously designated by the user, as indicated by block 96. In some embodiments, the offers interface may include an input by which a user can designate an offer, such as designating offers as being a user favorite, designating offers as being ranked in a particular fashion, or designating offers as likely being of interest to some other user, such as users adjacent one another in a social graph. The offers interface may include an input for a user to make designations, such as a user selectable input labeled "add to my favorites," or "add to my wallet," and an input for a user to request offers having a designation, such as a user selectable input labeled "view my favorites." or "view my wallet." Upon determining that the user made such a request, the process 80 includes transmitting a request for the offers previously designated by the user, as indicated by block 88. The transmission may be made to the offers engine 12, to the API server 16 or the web server 18, as described above with reference to FIG. 1, and may include an identification of the designation and the user.

The process 80, in some embodiments, further includes determining whether the user requests offers previously designated by another user, as indicated by block 100. The offers interface, in some embodiments, may include an input by which a user makes such a request, such as a user selectable input labeled "offers recommended by my friends." Upon determining that the user has made such a request, the process 80 transmits a request for offers previously designated by the other user (or users), as indicated by block 102. Again, the transmission may be to the offers engine 12 of FIG. 1, which may store or otherwise have access to offers designated by other users and a social graph of the user by which responsive offers are identified. Further, the offers interface may include an input by which the user may view identifiers of other users and add the other users to an offer-interest graph of the user. This offer interest graph may be referenced by the offers engine 12 to identify offers in response to the request of step 102.

The process 80 further includes, in some embodiments, receiving, at the user device, one or more offers responsive to the request, as indicated by block 104, and displaying the responsive offers on the offers interface, as indicated by block 106.

In some embodiments and some use cases, a selection from the user is received via the offers interface, thereby identifying an offer among the displayed offers, as indicated by block 108. In some embodiments, each of the offers may be displayed with an associated input by which the user selects the offer, such as a touchable or clickable button, region, or text. The selection, in some embodiments, may cause the offers interface to request additional data from the offers engine, such as instructions from the offers engine to navigate to an affiliate-network server associated with the offer or to navigate to a merchant server associated with the offer. In other embodiments, such instructions may be present within the offers interface, e.g., in the form of URLs linking to these servers.

The process 80 further includes determining whether the selected offer is compensable through an affiliate network, as indicated by block 110. This determination may be made by the offers engine 12, in some embodiments, for each of the offers being displayed prior to transmission of the offers to the user device. For example, each offer may be associated with a designation indicating whether the offer is compensable in this fashion, and the designation may be transmitted along with the offer, for instance, by associating the offer with HTML or JavaScript™ that so designate the offer, or by including a field including the designation in a response to an API call for each offer. The user device, in some embodiments, may take different actions depending on the designation associated with the selected offer.

Upon determining that the selected offer is not compensable through an affiliate network, the process 80 of this embodiment includes determining whether the selected offer is compensable directly from the merchant associated with the offer, as indicated by block 112. Again, the determination of block 112 may be performed, in some embodiments, by the offers engine 12 for each of the offers being displayed prior to transmission of the displayed offers, and each displayed offer may be associated with a designation based on the results of the determination, such as different HTML or JavaScript™ or a different field value in an API response. The user device may take different actions depending on this designation.

Upon determining that the selected offer is not compensable directly from the merchant, the process 80 may proceed to block 118 described below. Upon determining that the selected offer is compensable, the process 80, in this embodiment, may proceed to request the website of the merchant issuing the selected offer with a request that identifies the affiliate from whom the selected offer was obtained, as indicated by block 114. The request may be in the form of a URL having as a parameter an identifier of the entity operating the offer engine 12, thereby indicating to the merchant that the affiliate should be compensated in accordance with an arrangement between the merchant and the affiliate. Upon performance of step 114, the process 80 of the present embodiment proceeds to step 120 described below.

As indicated by block 110, upon determining that the selected offer is compensable through an affiliate network, the process 80 proceeds to transmit a request to the affiliate-network server for instructions to store data identifying an affiliate from whom the selected offer was obtained, as indicated by block 116. This request may be a request for content from the affiliate-network server that is not displayed to the user, or is not displayed to the user for an appreciable amount of time (e.g., less than 500 ms), and the request may include an identifier of the affiliate, the merchant, and the offer. The requested content may cause the user device to store in persistent memory of the browser of the user device (e.g., memory that lasts between sessions, such as a cookie or a database of the browser) an identifier of the affiliate operating the offers engine 12. This value may be retrieved later by the affiliate-network at the instruction of the merchant upon the user accepting the offer, for example by the user using a coupon code associated with the offer at the merchant, thereby allowing the merchant (or the affiliate network) to identify the appropriate party to compensate for the sale.

Upon transmitting the request the affiliate network server, the process 80 further includes requesting the website of the merchant issuing the selected offer, as indicated by block 118, and transmitting acceptance of the offer to the merchant via the merchant's website, as indicated by block 120. Accepting the offer, as noted above, may cause the merchant to compensate the affiliate operating the offers engine 12.

The process 80 of FIG. 3 is expected to facilitate relatively fast access to offers that are likely to be relevant to a user, as each of the determinations of step 88, 92, 96, and 100 provide different paths by which the user can specify offers in which the user is likely to be interested. Further, the determinations of step 110 and 112 provide dual mechanisms by which the operator of the offers engine 12 can be compensated, thereby potentially increasing revenue.

In some embodiments, as described further below, a native application interacts with the offers engine above to provide offers to users. Embodiments of the native application include functionality to enable users to redeem certain types of offers, e.g., online coupons. In such embodiments, a native application may provide for easier and faster redemption of offers and may eliminate or reduce complicated user actions to redeem online coupons. Accordingly, FIGS. 4A-4H depict screens of a native application, such as native application 52 (FIG. 1), executing on a mobile user device, such as mobile user device 28, illustrating redemption of online coupons, the native application operating in accordance with an embodiment of the present invention.

Figure 4A:
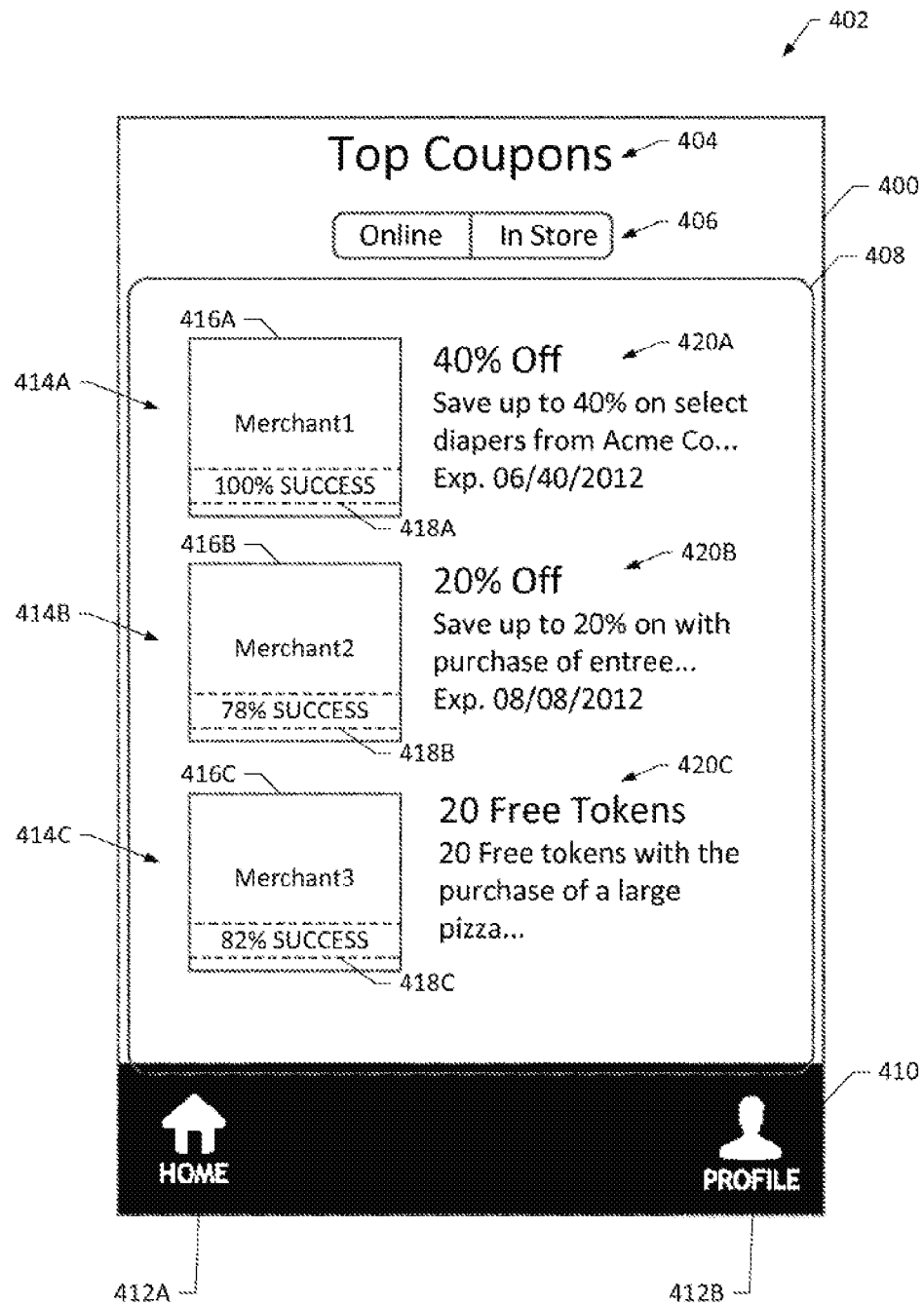
FIGS. 4A-4H are diagrams illustrating screens of a mobile user device executing a native application for online coupon redemption in accordance with an embodiment of the present invention.

FIG. 4A depicts a screen 400 of a native application 402 in accordance with an embodiment of the present invention. The screen 400 and other screens described below may be presented in a user interface of the mobile user device that may receive inputs from a user and provide outputs on a display. In some embodiments, the user interface may include a touchscreen, software modules, or any combination thereof. In such embodiments, inputs may be received as touches on the touchscreen, such as from a digit of a user, a stylus, etc. The screen 400 may include various user interface elements to display information to a user, and in some instances, receive user input. For example, the screen 400 may include a header portion 404, a coupon type toggle 406, an offer display area 408, and a navigation bar 410. These user interface elements may be located at various locations defined by sets of coordinates of the touchscreen, such as x-coordinates associated with a horizontal position and y-coordinates associated with a vertical position. As shown in FIG. 4A, the header portion 404 may be located at the top portion of the screen 400 (e.g., above the coupon type toggle 406 and the offer display area 408). Similarly, in some embodiments the navigation bar 410 may be displayed below the offer display area 408. In other embodiments, the information in the header portion 404 may be displayed in other areas, such as a footer portion, and the navigation bar 408 may be located in other areas of the application, such as a header portion.

The header portion 404 may display a title indicating the contents of the screen 400 presented to the user, as selected by the coupon type toggle 406. For example, the header portion 404 includes the text "Top Coupons," indicating to a user that top-ranked coupons are currently being presented. The coupon type toggle 406 may include a toggle button or other user interface element that enables a user to toggle between different types of coupons. For example, as shown in FIG. 4A, the coupon type toggle 406 may enable a user to toggle between "Online" coupons and "In Store" coupons. The navigation bar 408 may include navigation controls, e.g., buttons 412, such as a "Home" button 412A and a "Profile" button 412B. For example, by selecting the "Home" button 410A, a user may return to a home screen of a native application. Similarly, the selection of the "Profile" button 412B enables a user to access a user profile associated with the application.

The coupon area display area 408 may present offers, e.g., online coupons 414, for viewing and selection by a user. For example, as indicated by the header portion 404 ("Top Coupons"), the online coupons 414 may be top-ranked coupons determined by ranking criteria, such as user ratings, success rate, or other ranking criteria. The online coupons 414 may include any number of coupons associated with merchants providing goods, services, or a combination thereof. Each electronic coupon 414 may be presented with information describing the coupon, such as a merchant graphic 416, a success rate banner 418, and a coupon summary 420. The merchant graphic 416 may include text, an image (e.g., a merchant logo), or combination thereof identifying the merchant associated with the coupon. The success rate banner 418 may indicate a success rate for a coupon that indicates the percentage of instances in which the coupon was successfully used. In some embodiments, for example, the success rate may be determined based on user feedback on coupon usage. The coupon summary 420 may include information about the coupon, such as the goods, services, or both associated with the coupon, the discount or other offer provided by the coupon, the expiration date, any other suitable information, or a combination thereof.

For example, as shown in FIG. 4A, a first electronic coupon 414A may be presented with a merchant graphic 416A ("Merchant1") and may include a success rate banner 418A indicating the success rate of the coupon ("100% success"). The coupon 414A may be presented with a coupon summary 420A summarizing the discount provided by the coupon ("40% Off Save up to 40% on select diapers from Acme Co . . . "). Additionally, the coupon summary 420A may include the expiration date of the coupon ("Exp. 06/40/2012"). The other coupons 414B and 414C illustrated in FIG. 4A may include similar information, such as merchant graphic 416B, success rate banner 418B, coupon summary 420B, and so on. Additionally, the coupons 414 may include coupons for any type of offer, such as offers for free goods, services, or both, as indicated by the coupon summary 420C for electronic coupon 414C ("20 Free Tokens").

Figure 4B:
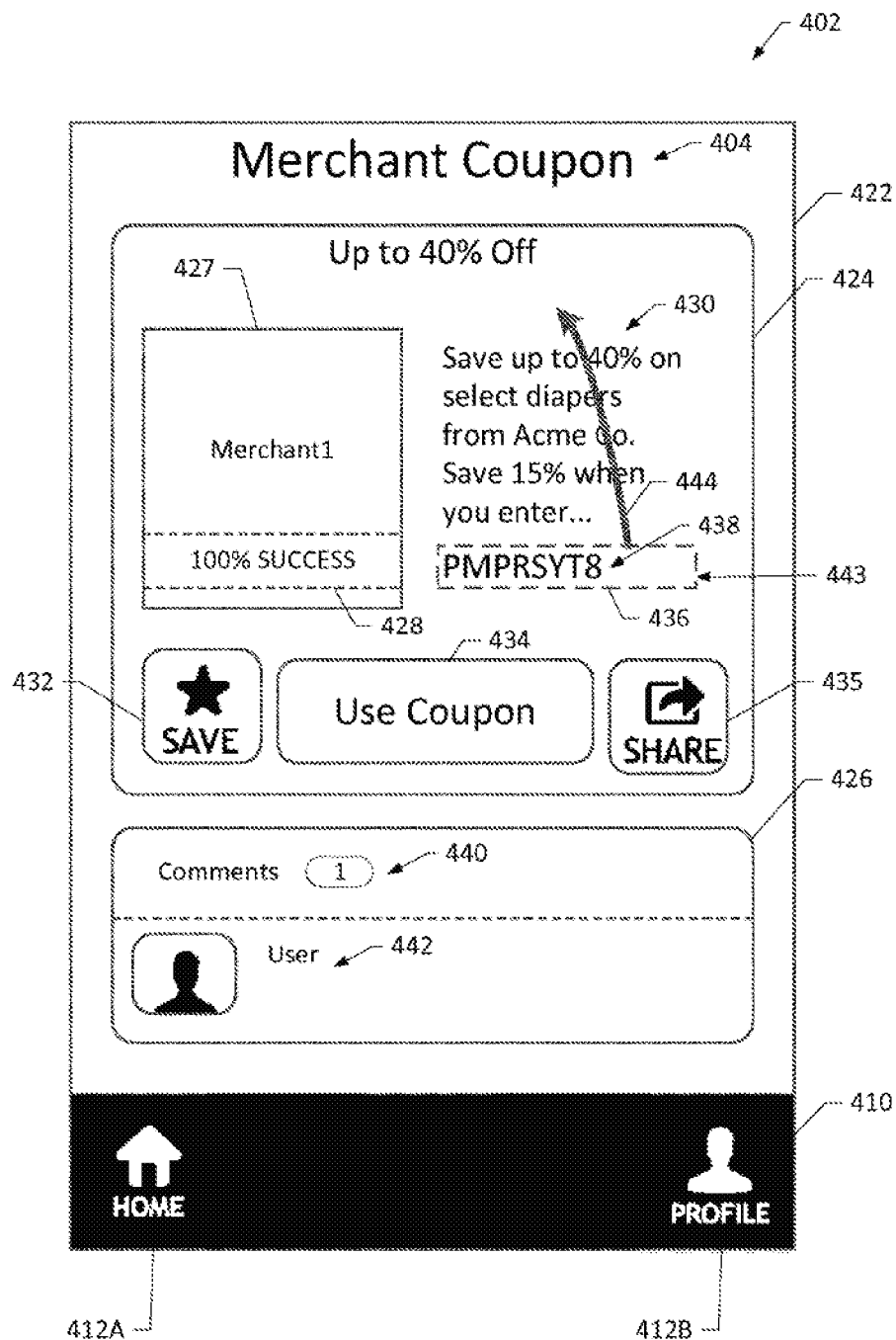

To use a coupon, a user may select (e.g., touch) one of the online coupons 414. For example, a user may select any portion of the coupon 414A, such as the merchant graphic 416A, the coupon summary 420A, etc. Upon selection of a coupon, details about the coupon may be presented to enable a user to use the coupon (i.e., redeem the coupon) with a transaction with a merchant. FIG. 4B depicts another screen 422 of a mobile user device in accordance with an embodiment of the present invention. The screen 422 may be presented in response to a user selection of an electronic coupon, such as selection of the coupon 414A depicted in FIG. 4A. As shown in FIG. 4B, the header portion 404 may change to include the name of the merchant ("Merchant1 Coupon") to indicate contents of the screen 422. The screen 422 may include a coupon detail area 424, a social network portion 426, and the navigation bar 410 described above.

The coupon detail area 424 presents detailed information about the selected electronic coupon 414A. For example, a merchant graphic 427, success rate banner 428, and coupon detail 430 may be presented. Additionally, the coupon detail area 424 may include various controls, such as a save button 432, a "Use Coupon" button 434, and a "Share" button 436. In some embodiments, the controls may be any suitable user interface control, such as toggles, icons, switches, sliders, etc. As described above, the merchant graphic 427 may display text, images (e.g., logos), or any combination thereof associated with the merchant, and the success rate banner 428 may display a determined success rate for the selected coupon 416A, such as a success rate based on user feedback.

Additionally, the coupon detail area 424 displays a coupon code box 436 having an identifier, e.g., a coupon code 438 ("PMPRSYT8"), associated with the coupon 414A. The coupon code 446 may be displayed in the coupon code box 436 or other element of a user interface. The coupon code 438 may be a relatively short text string (e.g., shorter than 25 characters or 5 words) selected to be both distinct and memorable to users. In some cases, an image or other visibly distinctive user-manipulable body of data serves the role of the coupon code 438. As described in detail below, the movement of the coupon code box 436 may be animated to indicate various transitions within the native application 402, potentially making the operation of the native application more intuitive to users.

As mentioned above, the coupon detail area 424 includes various user interface elements to receive inputs from a user. The save button 432 presented in the coupon detail area 424 enables a user to save a coupon for later use. The share button 436 enables a user to share coupons, such as sharing across social networking services, microblogging services, or other services. To use the selected coupon 414A, a user may select (e.g., touch) the "Use Coupon" button 434. As described below, upon selection of the "Use Coupon" button 434, another screen may be presented that enables a user to access the website of the merchant associated with the selected coupon 414A. Corresponding event handlers of the native application may detect the user interactions described herein (e.g., onTouch, onClick, onMove, touch events, and the like) and, in response, effectuate the described functionality.

The feedback portion 426 depicted in the screen 422 may include information from other users and a user's profile. The feedback and profile may be provided within the native application 402. The feedback portion 426 may present a comment indicator 440 that indicates if other users have commented on the selected coupon 416A and provides the number of such comments. Additionally, the feedback portion 426 may include user profile information 428, such as a picture 442 associated with a user's profile and other profile information.

As mentioned above, a user may select the "Use Coupon" button 434 to use the selected coupon 414A for a purchase of goods and services. Upon selection of the "Use Coupon" button 434, the coupon code box 436 may visually move from a first location 443 shown in the screen 422 to a second location. This movement is illustrated by the arrows depicted in FIGS. 4B-4D. As shown in FIG. 4B, after a user selects the "Use Coupon" button 434, the coupon code box 436 may move (e.g., translate) along the path indicated by arrow 444. In some embodiments, the coupon code box 436 may move in towards the header portion 404, translating through changing x and y coordinates. The coupon code box 436 may move along a generally linear path, a generally arcuate path, or any combination thereof. In other embodiments, the coupon code box 436 may move to any other locations, such as a footer or other locations within the screen 422. Additionally, in some embodiments, the coupon code box 436 may only be provided at the second location without animation of a visual movement.

Figure 4C:
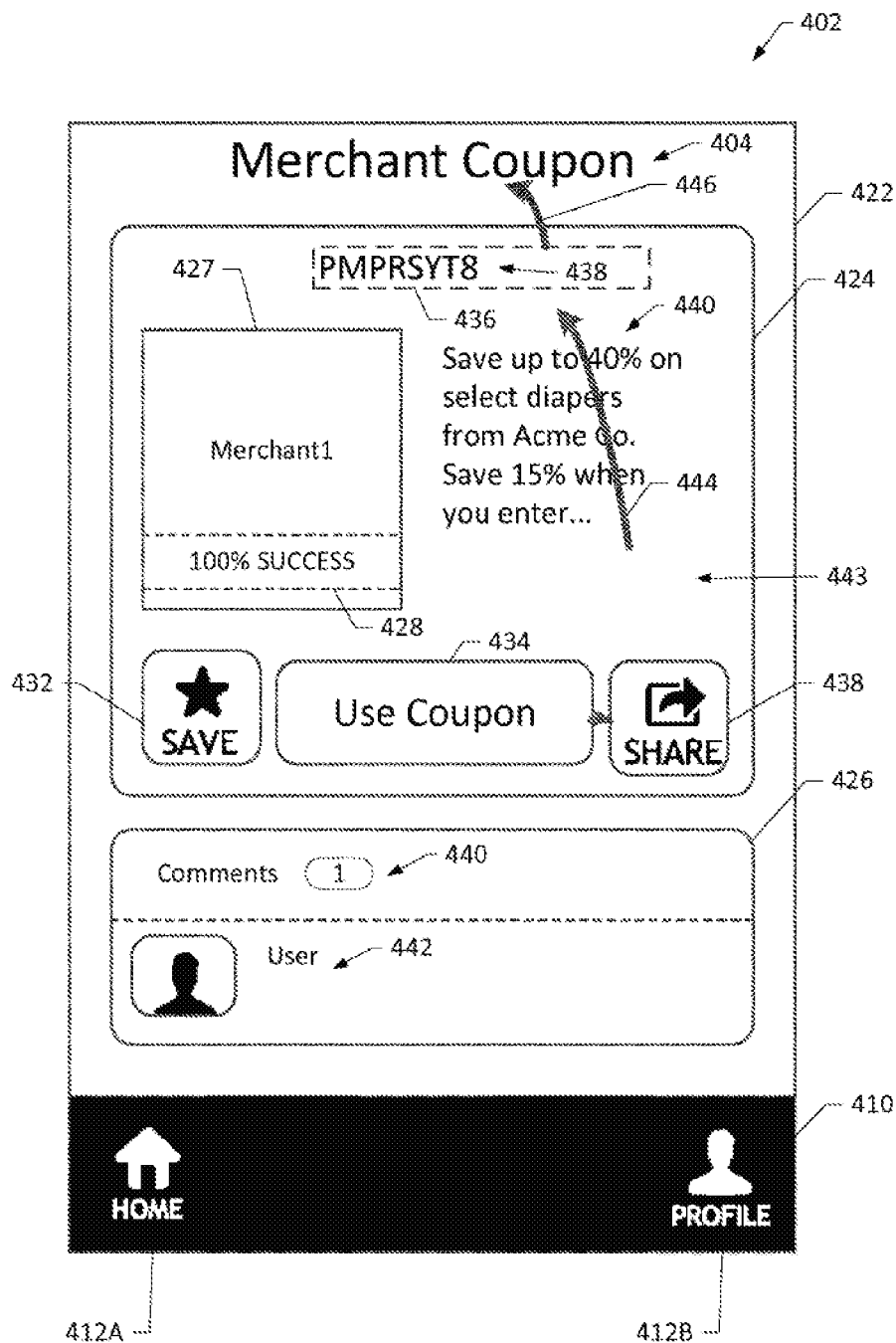

FIG. 4C further depicts the screen 422 and illustrates a stage in the animation of the coupon code box 436 in accordance with an embodiment of the present invention. As shown in FIG. 4B, the coupon code box 436 may move from the first location 443 and along the path indicated by arrow 444 towards a second location at the header portion 404. During the animation, the coupon code box 436 may continue to move (e.g., translate) towards the header portion 404, as indicated by arrow 446.

Figure 4D:
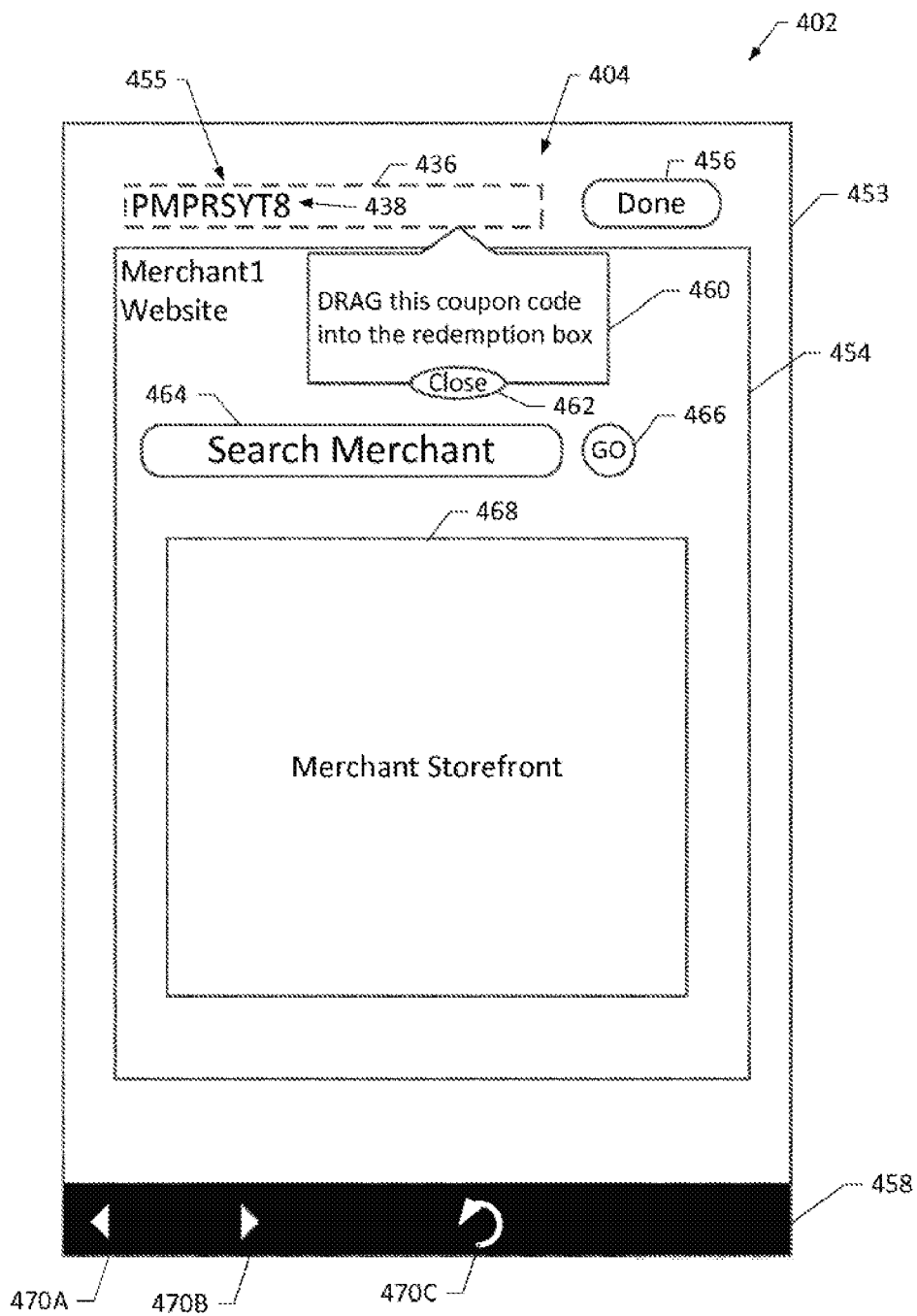

After completion of the move, the coupon code box 436 may be located at a second location at the header portion 404. Accordingly, FIG. 4D depicts a screen 453 of a mobile user device that illustrates the completion of the animation of the coupon code box 436 in accordance with an embodiment of the present invention. Additionally, as shown in FIG. 4D, the screen 453 includes a merchant website 454 displayed by the mobile user device. As shown in this figure, after a user selects the "Use Coupon" button 434, the website of the merchant associated with coupon may be presented to enable a user to purchase goods or services from the merchant using the coupon. As mentioned above, the native application 402 may be include or be capable of instantiating a web browser, e.g., a webview object, and the merchant website may be retrieved via an affiliate networking redemption process by which the web browser requests content from an affiliate network server, the request including an identifier of the provider of the native application, and the affiliate network returning content operative to store an affiliate identifier in a cookie (or other persistent, browser-accessible storage) accessible to the affiliate network operator and instructions to redirect the browser to the merchant website. Or an identifier of the provider of the native application may be appended to a URL of the merchant website to signal that the provider should be compensated. Thus, web content, such as the merchant website 454, may be retrieved from the Internet via a network accessible by a mobile user device executing the native application 402, as described above. In some embodiments, for example, the presentation of web content in the native application 402 may be referred to as a "web view."

As noted above, FIG. 4D depicts the end of the animation of the coupon code box 436. As shown in FIG. 4D, the coupon code box 436 moves (e.g., translates) in a generally vertical direction to a second location 455 until the coupon code box 436 is located in the header portion. Additionally, in some embodiments, the coupon code box 436 may be resized. Any previous text, images or other elements in the header portion 404 may be removed or replaced upon progression to the screen 453. The header portion 404 of the screen 453 may also include a "Done" button 456. Additionally, the screen 453 includes a web navigation bar 458 located below the merchant website 454. As described below, the web navigation bar 458 may include controls for browsing the web content, e.g., the merchant website 454, presented in the application 402.

Depicting the coupon code 438 in a different location after a user selects the use coupon button 434 is expected to make coupon use more intuitive, as the user has a visual indication that a coupon code 438 has been selected, and that the native application is storing the coupon code 438 for use. Depicting an animated movement to such a location, e.g., simulating movement of a physical item, is expected to make the native application appear responsive to the user and create a sense that the coupon code 438 is more like a tangible physical item to be accorded elevated importance in the mind of the user. The movement may be of constant speed, or movement may change speed, simulating for example generally constant acceleration and deceleration with an intervening duration of constant speed. In some cases, animated movement may simulate damped vibrating movements as the coupon code 438 settles into the second position. In some cases the coupon code 438 may also rotate or perform other movements as it translates to accentuate the effect. The coupon code 438 may also change size, e.g., linearly enlarging over some duration prior to movement to simulate elevation normal to the screen, followed by translation to the second position, and a similar reduction in size to simulate lowering into the second position. Some embodiments may calculate parameters of, and render, a drop shadow as the coupon code 438 attains and moves through such the simulated elevated height toward the second location, following the coupon code 438 with the drop shadow, and adjusting and removing the drop shadow as the coupon code 438 is elevated and lowers. Other embodiments may distort the coupon code 438 during movement, translating, for example an upper left corner initially faster than a lower right corner, and calculating and rendering a skew transform of increasing severity over some duration on an image of the coupon code 438. In some embodiments, the coupon code 438 may track a user gesture toward the header, remaining, for example under the touch of the user as the user drags the code upward and snapping in to place once a threshold proximity to the second position is attained.

In some embodiments, a help balloon 460 may be presented that includes text to aid the user in using the coupon code 438. The help balloon 460 may include instructions or other text that describes how to move the coupon code box 436, as illustrated below in FIGS. 4E-4H. For example, as shown in FIG. 4D, the help balloon 460 includes text "DRAG this coupon code into the redemption box" to instruct a user how to move the coupon code box 436 in the manner described below. The help balloon 460 may also include a "Close" button 462 to enable a user to close the help balloon 460 and remove it from display in the application 402. In some embodiments, the help balloon 460 may be presented when screen 453 is displayed. Additionally, or alternatively, the help balloon 460 may be displayed in response to a user input, such as touch located at or near the coupon code box 436, a cursor located at or near the coupon code box 436, etc. In one embodiment, the help balloon 460 may include a chat window that will provide the user to engage an online chat application to receive and respond to communications such as text communications. For instance, the help balloon 460 may include a text input that posts user-entered questions to the offers engine (e.g., asynchronous with an XMLHttpRequest), which may respond with answers to the questions, e.g., with text displayed in-line with the user-entered question. In some cases, responses are identified by 1) parsing keywords from the user-entered question, for instance by removing stopwords, 2) searching a plurality of frequently-asked-question records for answers, associated keywords, or associated questions including the parsed keywords, 3) ranking responsive candidate answers, for instance based on the number of corresponding keywords, and 4) sending the highest ranking answer to the client device, which may execute instructions associated with the help balloon 460 that display the response. In some cases, answers to user questions are manually entered or selected by a human operator via the above-described administrator interface, or manually entered answers are provided when an automated selection based on keywords fails or fails to provide an answer after more than a threshold number of exchanges with the user.

The merchant website 454 may include a variety of web content that enables a user to search or browse for goods, services, or both and select and order such goods and servers. For example, a user may select the "Use Coupon" button 443 to access the merchant website 454 to order goods and services associated with the selected coupon 414A. As shown in FIG. 4D, for example, web content of the merchant website 454 may include a search field 464, search button 466, and a merchant storefront 468. It should be appreciated that the web content depicted in FIG. 4D is merely an example and merchant websites may include a wide variety of web content, designs, and functionality. Such functionality may include, for example, the ability to search the merchant website 454 by entering a search query into the search field 464 and selecting (e.g., touching, clicking, etc.) the search button 466. Additionally, the merchant storefront 468 may display goods, services, or both offered by the merchant and available for order by a user. In some embodiments, a user may use the search field 464 to find the goods, services, or both associated with the selected coupon. In other embodiments, the goods or services may be presented to the user in the merchant storefront 468 in response to a selection of the "Use Coupon" button 443.

Figure 4E:
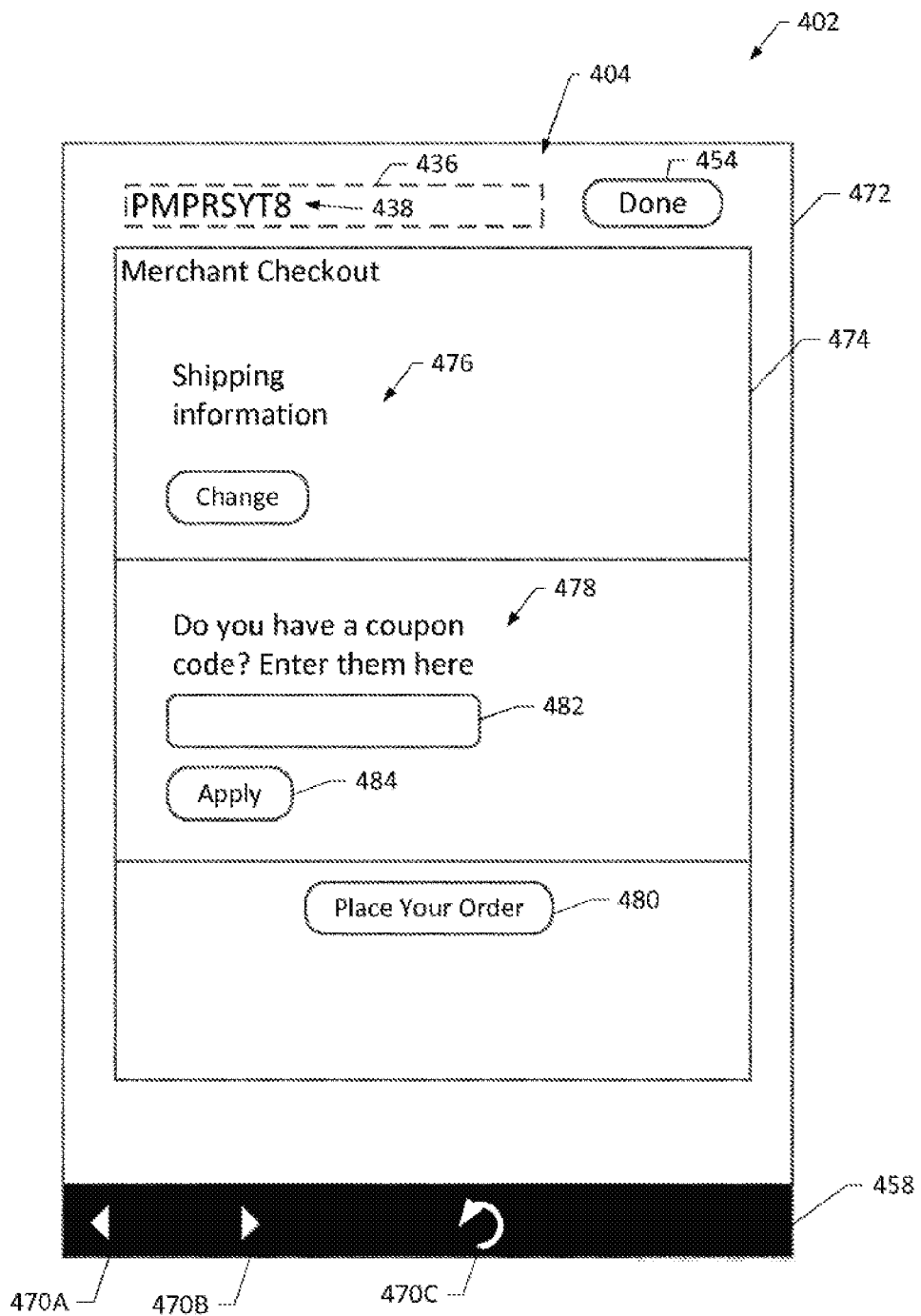

As described above, a user may use the merchant website to order goods and services associated with the selected coupon, such as by adding the goods and services to a virtual "shopping cart" and selecting an option to checkout. FIG. 4E depicts a screen 472 of the application 402 illustrating a checkout page 474 of the merchant website 454 in accordance with an embodiment of the present invention. As described above, web content such as the checkout page 474 may be retrieved from the Internet via a network accessible by a mobile user device executing the application 402, and this web content may be displayed within the application 402 in the manner described above. As shown in FIG. 4E, the header portion 404 includes the coupon code box 436 and the "Done" button 454. That is, the header portion 404 may retain the coupon code box 436 to ensure the coupon code box 436 is accessible until a user has completed a transaction, e.g., an order for goods, services, or both, with the merchant. Alternatively, a user may exit the display of web content in the application 402 by selecting the "Done" button 454 and returning to previous screens of the application 402.

The merchant checkout page may include various web content that enables a user to view and enter order information and complete an order for goods, services, or both. For example, the merchant checkout page 474 may include an order information portion 476, a code entry portion 478, and a checkout button 480. The order information portion 476 enables a user to enter a shipping address, a billing address, payment information, and the like. By selecting the checkout button 478 ("Place Your Order"), a user may submit an order for fulfillment by the merchant. The code entry portion 478 may enable a user to enter coupon codes, promotional codes, gift card codes, or any other codes that may be applied to an order. The code entry portion 478 may include an input field 482 (e.g., a text field that receives text input) and a submission button 484 ("Apply"). By entering a coupon code or other code into the input field 482 and selecting the submission button 484, a user may submit a coupon code to apply a coupon associated with the merchant. In some embodiments, the input field 482 may accept images or other input.

Figure 4F:
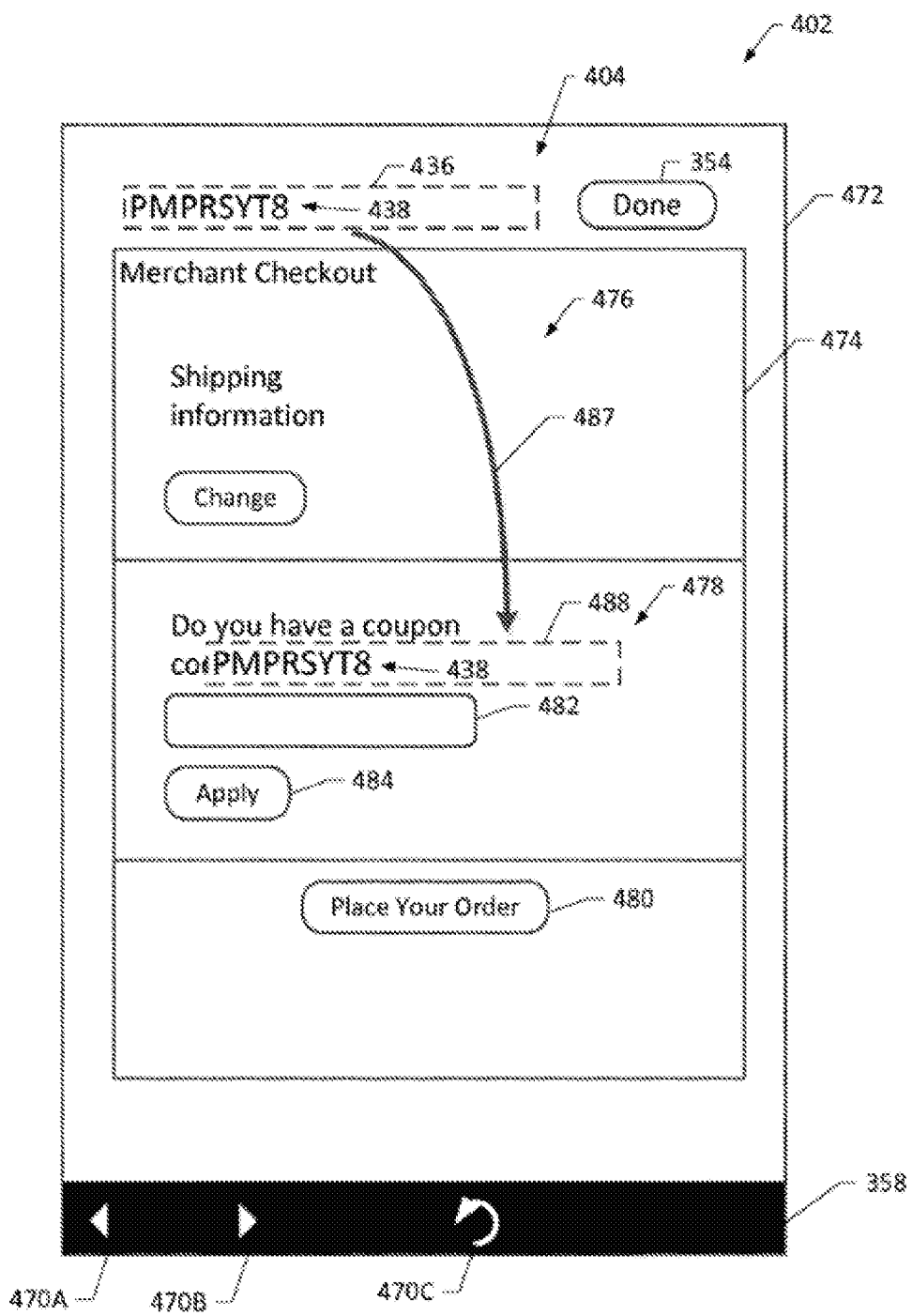
Figure 4G:
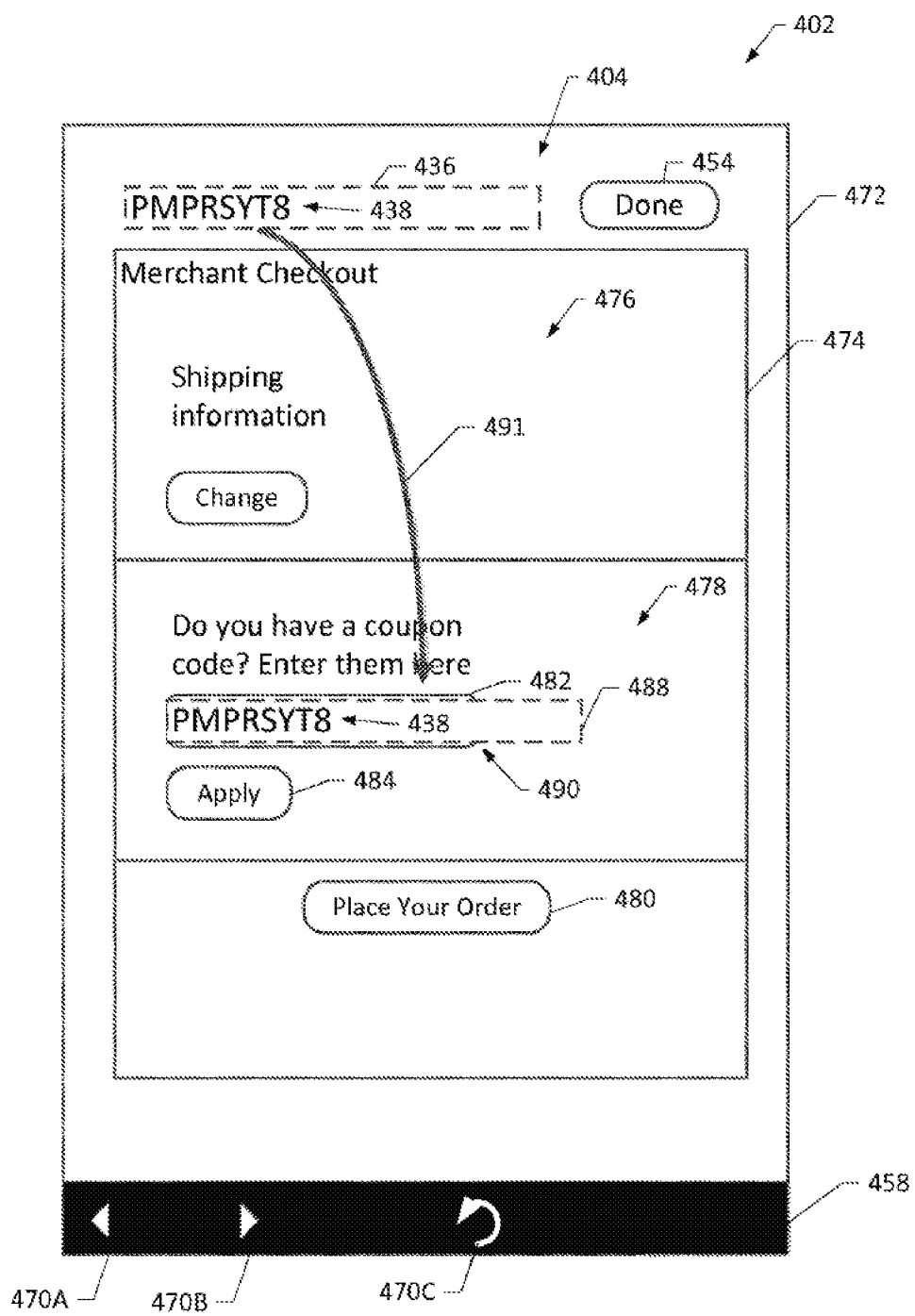
Figure 4H:
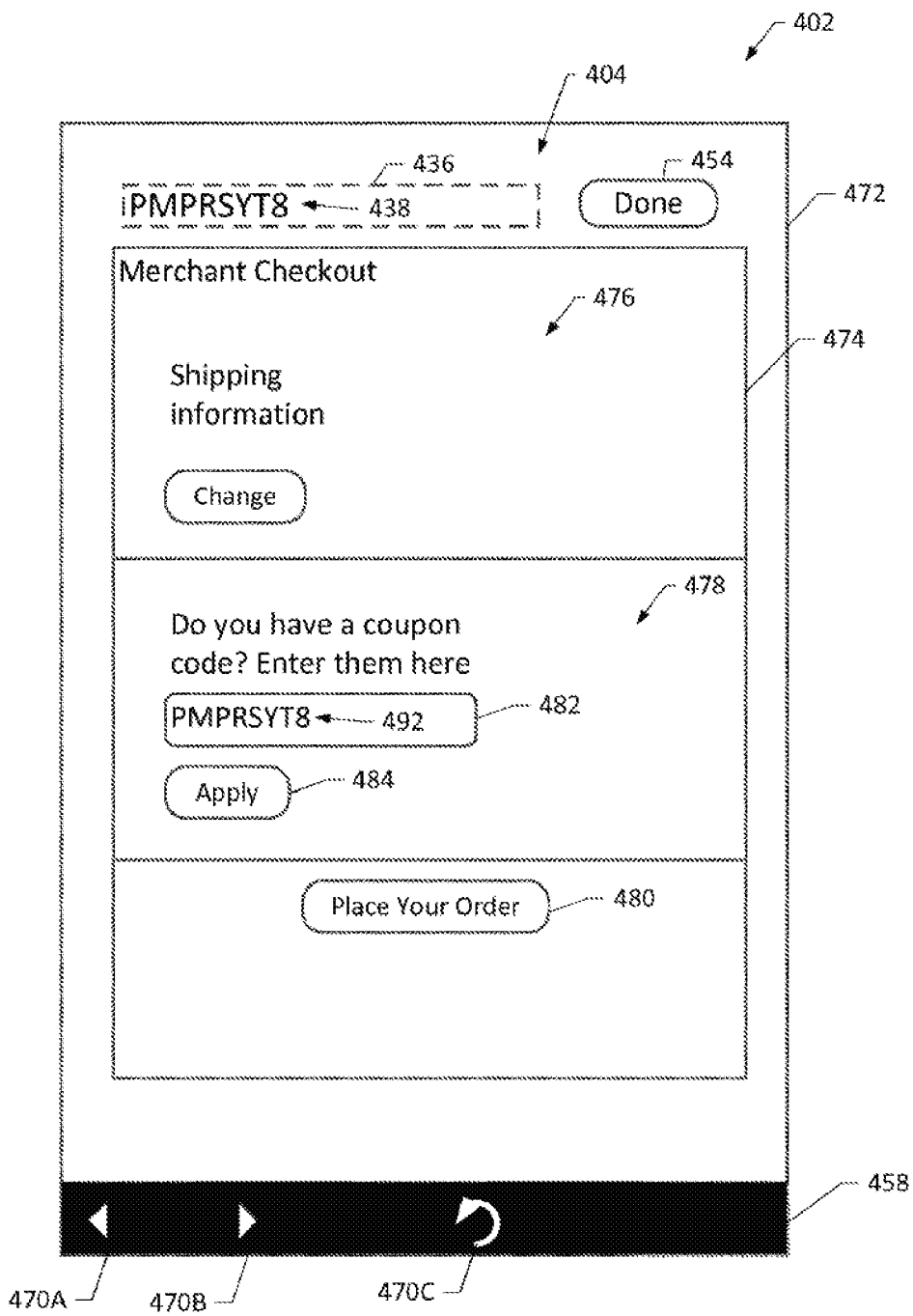

As described below in FIGS. 4F-4H, the application 402 provides for easy and intuitive entry of the coupon code 438 of the selected coupon 414A via a gesture within the user interface. As shown in FIGS. 4F-4H, a user may drag and drop the coupon code box 436 over the input field 482 to have the coupon code 438 entered in the input field 482. Thus, a user does not need to memorize the coupon code or manually type the code directly into the input field 482. Although FIGS. 4F-4H are described with reference to an input field of a checkout webpage associated with a merchant, it should be appreciated that the same techniques may apply to input fields located in any webpage associated with a merchant that may receive a coupon code and for which a user desired to enter the code. For example, a shopping cart webpage, a product webpage, or other merchant webpages may have an input field that may be processed in the manner described above, such that a user may drag-and-drop a coupon code box to enter a coupon code in the input field.

FIG. 4F depicts the screen 472 illustrating the selection and animation of the coupon code box 436 in accordance with an embodiment of the present invention. As shown in FIG. 4F, a user may select (e.g. touch, click, etc.) the coupon code box 436 and drag the coupon code box 436 from a first position 486 towards the input field 482, such as along the path indicated by arrow 487. In some embodiments, the selection may include a touch referred to as a "long press," generating a long-press event in the native application that the above-mentioned event handler handles to initiate the following drag and drop operation. During the drag, a visual copy 488 of the coupon code box 436 may be animated along the path indicated by arrow 487 to indicate the movement of the coupon code box 436. The animation may follow one of the animation routines described above, including tracing the position of a touch as the touch is dragged across the screen.

Next, as shown in FIG. 4G, the visual copy 488 of the coupon code box may be dragged to or near the input field 482 and dropped (e.g., by releasing a touch), generating a touch-up or touch-end event to which the native application responds to effectuate the subsequent operations. FIG. 4G depicts the screen 472 further illustrating animation of the drag-and-drop of the visual copy 488 to a second location 490 located at or near the input field 482, in accordance with an embodiment of the invention. As shown in FIG. 4G, the visual copy 488 (e.g., an area of the screen, such as a rectangle, depicting the code) may be animated and visually move (e.g., translate) along the path indicated by arrow 491 as a user drags the visual copy 488 toward the input field 482. After the visual copy 488 has been dragged over the input field 482, a user may deselect the visual copy 488 (such as by releasing a touch, releasing a click, etc.).

After deselection of the visual copy 488 at the second location 490, the coupon code 438 of the coupon code box 436 may be entered into the input field 482, entering the text depicted in the visual copy 488. FIG. 4H further depicts the screen 472 and illustrates entry of the coupon code 438 in the input field 482 in response the gesture described above and in accordance with an embodiment of the present invention. After a user deselects (e.g., releases a touch) the visual copy 488 at the second location 490 at or near the input field 482, the visual copy 488 may disappear and a value 492 (e.g., a text value) corresponding to the coupon code 438 may entered (e.g., pasted) into the input field 482. A user may then select the submission button 484 to apply the coupon code to the order. Thus, the coupon code may be entered into the input field 482 by dragging and dropping the visual copy 488 of the coupon code box 436 to a location at or near the text box 482. After application of the coupon code, a user may submit the order to the merchant by selecting the "Place Your Order" button 478.

Thus, the native application may have access to inputs, e.g., inputs of text type in forms of the rendered merchant webpage. The native application may employ a variety of techniques to identify the appropriate document object model (DOM) element corresponding to the text input. For instance, merchants may designate a coupon code text entry element with a specific class or other identifier that the native application uses to get the appropriate element from the DOM for insertion of the coupon code text, e.g., by changing a value attribute of the element. Or the native application may identify the corresponding DOM element based on correspondence between the screen location of the touch-release event and the location of text inputs on the screen, generating an inventory of text input DOM elements and their offsetTop and offsetLeft coordinates, and selecting the closest text input to the touch-up event location to receive the coupon code. In some cases, the candidate text inputs are filtered based on their context, removing, for instance, those text inputs in div boxes having text relating to an address or name and favoring those text inputs in div boxes having text with the string "coupon."

Figure 5:
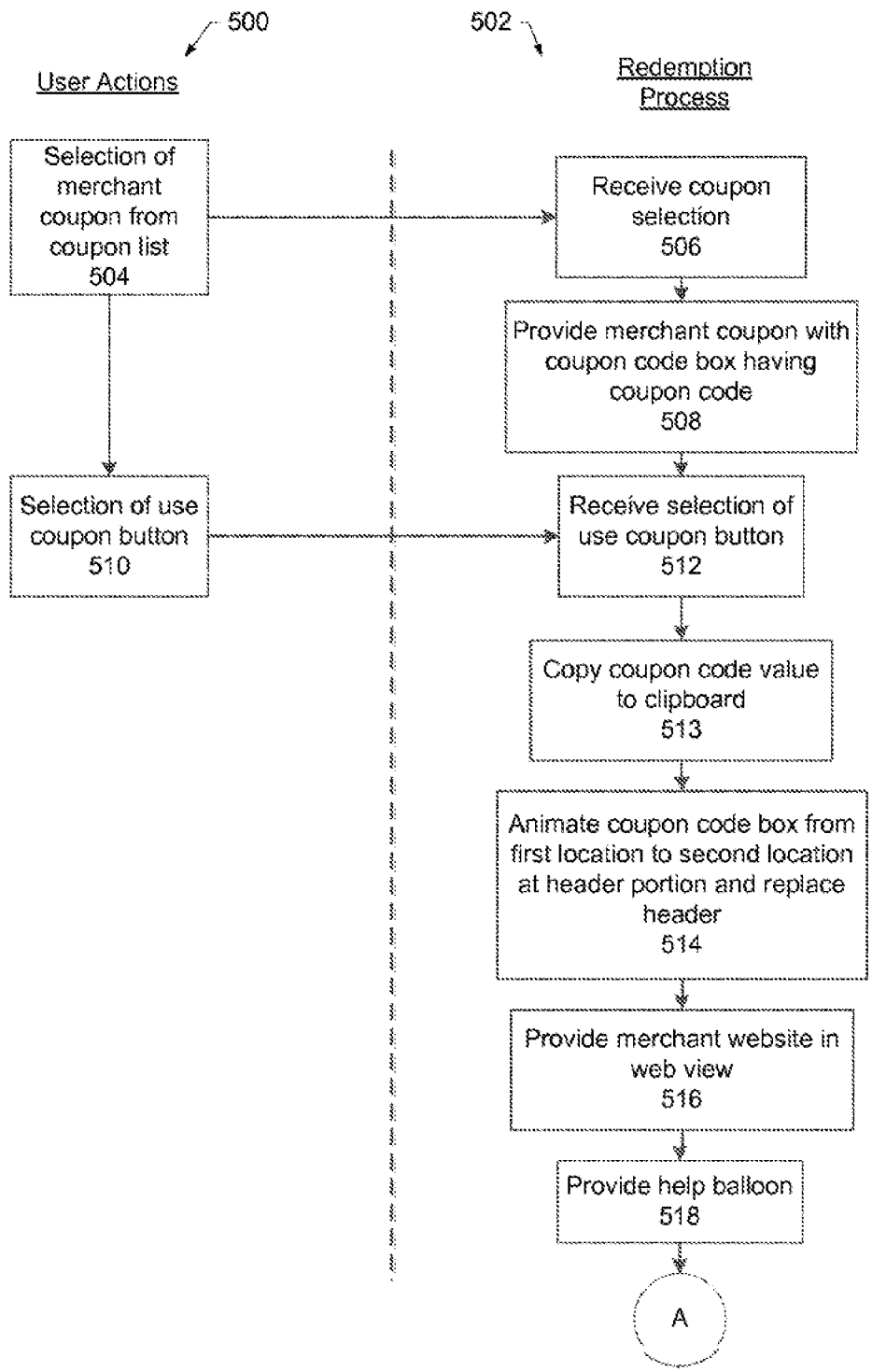
FIG. 5 is a block diagram illustrating user actions and a first portion of a redemption process in accordance with an embodiment of the present invention.

FIG. 5 depicts a first portion of user actions 500 and a first portion 502 of a coupon redemption process in accordance with an embodiment of the present invention. Some or all steps of the process portion 502 may be implemented as executable computer code stored on a non-transitory tangible computer-readable storage medium and executed by one or more processors of a special-purpose machine, e.g., a computing device programmed to execute the code. Initially, a user may select a coupon from a coupon list (block 504) presented in a native application, as shown above in FIG. 4A, and the coupon selection may be received (box 508). Next, as described above in FIG. 4B, the selected coupon may be provided with a coupon code box having a coupon code associated with the selected coupon (block 508). If a user decides to use the coupon, the user may select a use coupon button (block 510) and the selection of the button may be received (block 512). Additionally, a value corresponding to the coupon code of the coupon code box may be copied to a clipboard accessible by the application (block 513). As illustrated above in FIGS. 4C and 4D, a visual movement of the coupon code box from a first location to a second location at the header portion of the application may be animated and the elements in the header portion may be replaced by the coupon code box (block 514). Next, after a user has selected to use a selected coupon, the merchant website may be provided within the native application (block 516), e.g., in a web view within the native application. For example, as described above, a merchant website may be requested from one or more merchant webservers. Additionally, in some embodiments, a help balloon may be provided adjacent to the coupon code box with instructions or other text to describe how to use the application (block 518). The redemption process may continue with a second portion depicted in FIG. 6, as indicated by connector block A.

Figure 6:
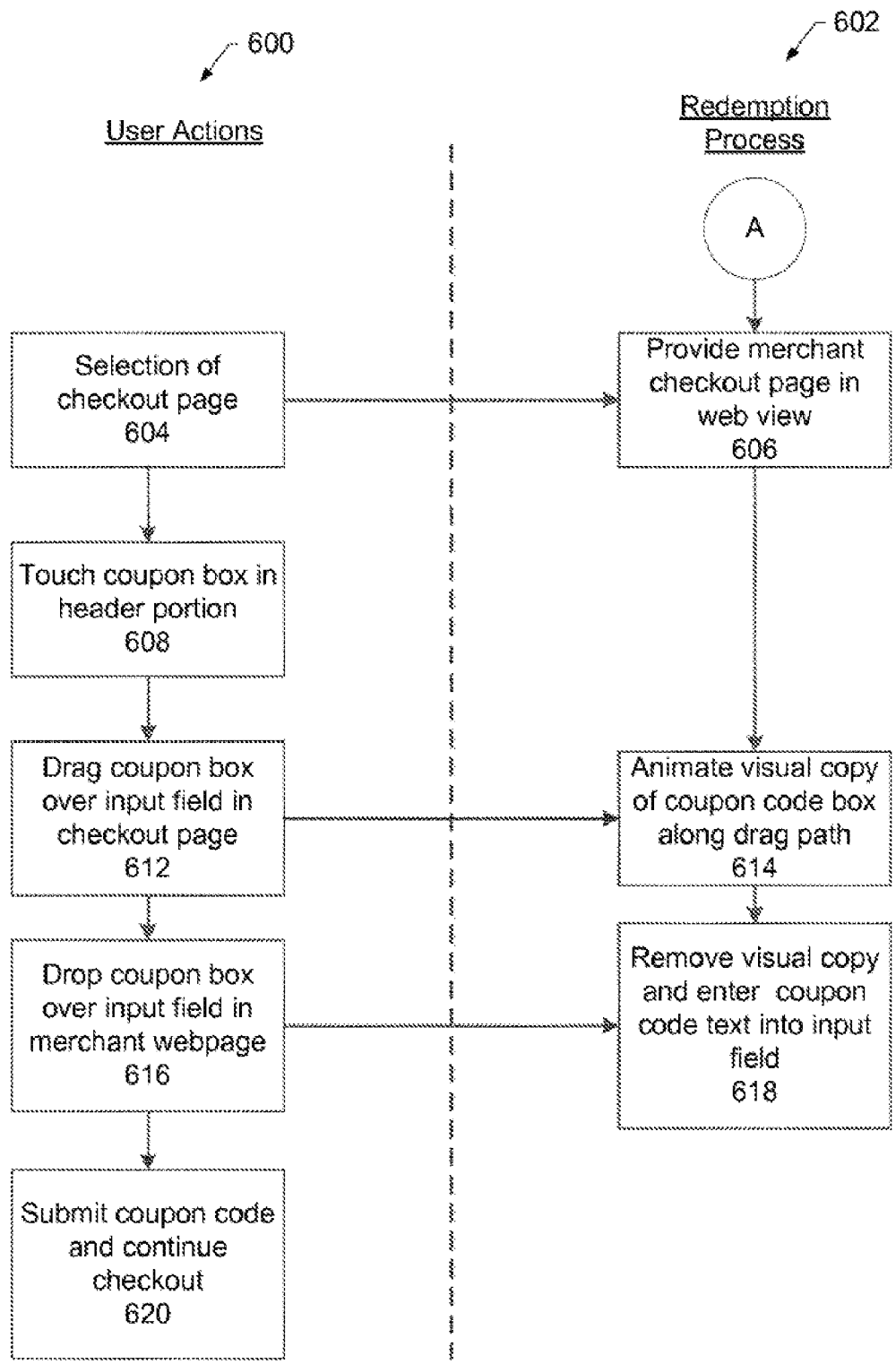
FIG. 6 is a block diagram illustrating user actions and a first portion of a redemption process in accordance with an embodiment of the present invention.

FIG. 6 depicts user actions 600 and a second portion 602 of a coupon redemption process in accordance with an embodiment of the present invention. Some or all steps of the process portion 602 may be implemented as executable computer code stored on a non-transitory tangible computer-readable storage medium and executed by one or more processors of a special-purpose machine, e.g., a computing device programmed to execute the code. As shown by connector block A in FIG. 6, the second portion 602 of the redemption process may continue from the first portion 404 described above and illustrated in FIG. 4 For example, after a user selects to use a coupon, a user may search and browse a merchant website to purchase goods, services, or both associated with the coupon. Subsequently, a user may select a checkout page within the merchant website to complete an order for goods, services, or both (block 604). In response, a merchant checkout page may be provided within a native application (block 606), e.g., in a web view, as described above and illustrated in FIG. 4E.

Next a user may drag-and-drop a coupon code box to an input field within the merchant checkout page, as described above and illustrated in FIGS. 4F and 4G. To initiate the drag-and-drop, a user may select (e.g., touch) the coupon code box in the header portion of the application (block 608)). Next, the user may drag the coupon code box over the input field within the checkout page (block 612). Accordingly, a visual copy of the coupon code box may be animated from a first location to a second location along the drag path performed by the user (block 614). A user may then complete the drag-and-drop by dropping the visual copy of the coupon code box at or near the input field within the checkout page (block 616). The visual copy of the coupon code box may be then be removed and the value corresponding to the coupon code may be entered into the input field (block 618), as described above and illustrated in FIG. 4H. After the coupon code is entered into the input field, a user may submit the coupon code for redemption and continue the checkout to complete the order (block 620). As described above in FIG. 3, redemption of offers, such as a selected coupon, may occur through an affiliate network or directly from a merchant.

Figure 7:
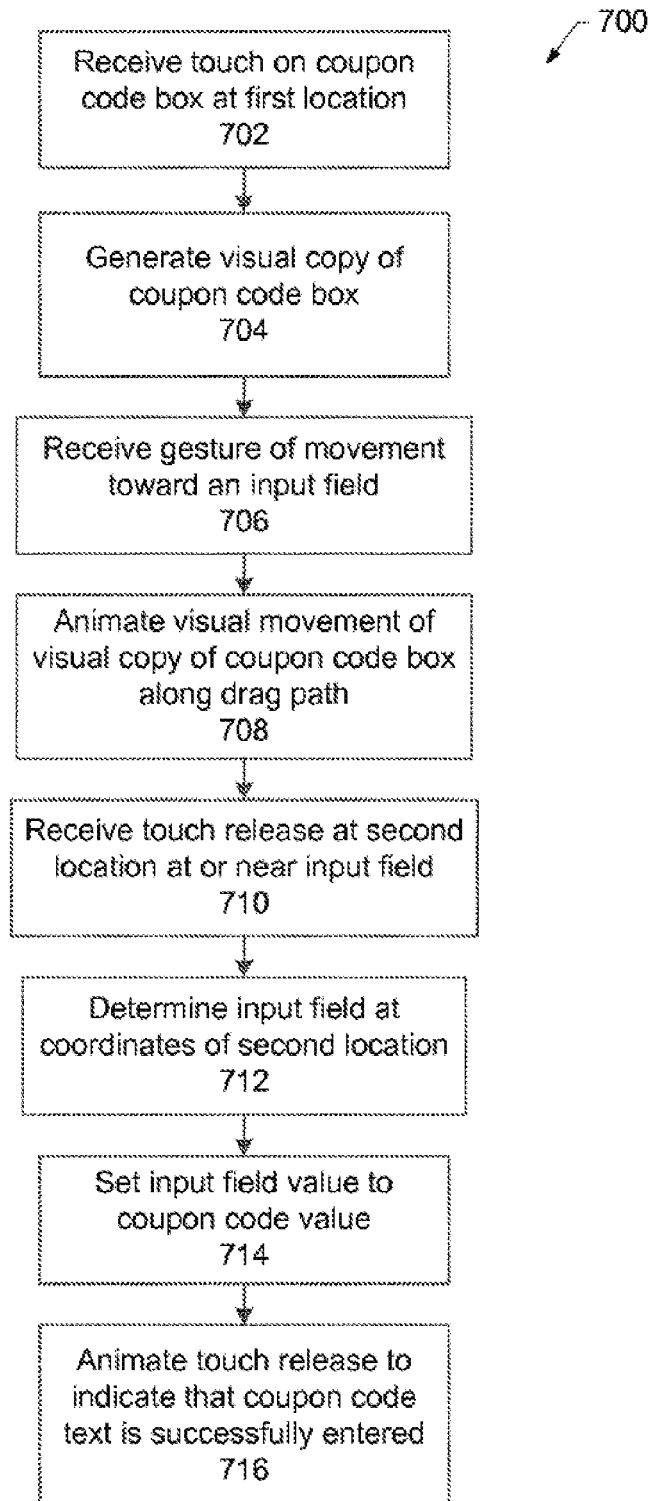
FIG. 7 is a block diagram of a process for implementing drag-and-drop in a redemption process in accordance with an embodiment of the present invention.

FIG. 7 depicts a process 700 for implementing the drag-and-drop of a coupon code box to an input field in accordance with an embodiment of the present invention. For example, the process 700 may be implemented within the second portion 602 of the redemption process described above and illustrated in FIG. 6. Some or all steps of the process 700 may be implemented as executable computer code stored on a non-transitory tangible computer-readable storage medium and executed by one or more processors of a special-purpose machine, e.g., a computing device programmed to execute the code. Offers may be obtained from the above-mentioned offers engine of FIG. 1, and initially, a touch on a coupon code box presented in a native application may be received at a first location, e.g., at a header portion of the native application (block 702). In response, the value of a coupon code of the coupon code box may be copied to a clipboard and a visual copy of the coupon code box may be generated (block 704). Next, a gesture (e.g., a drag) of movement of the touch may be received as a user drags the coupon code box towards an input field of a webpage associated with a merchant (block 706). To visually indicate the steps described above to a user, a visual movement of the visual copy of the coupon code box along the drag path may be animated (block 708). When the coupon code box is at or near the input field, a touch release at a second location may be received (block 710).

Based on the location of the touch release, the location of the input field may be determined by finding the coordinates of the second location (block 712). For example, in some embodiment the location of the input field may be determined from a document object model (DOM) associated with the webpage. Based on this located input field, the input field may be set to a value corresponding to the coupon code associated with the coupon code box (block 714). Finally, the touch release may be animated to indicate that the coupon code is successfully entered in the input field (block 716). For example, the visual copy may be removed from the user interface and the value displayed in the input field of the webpage associated with the merchant.

Figure 8:
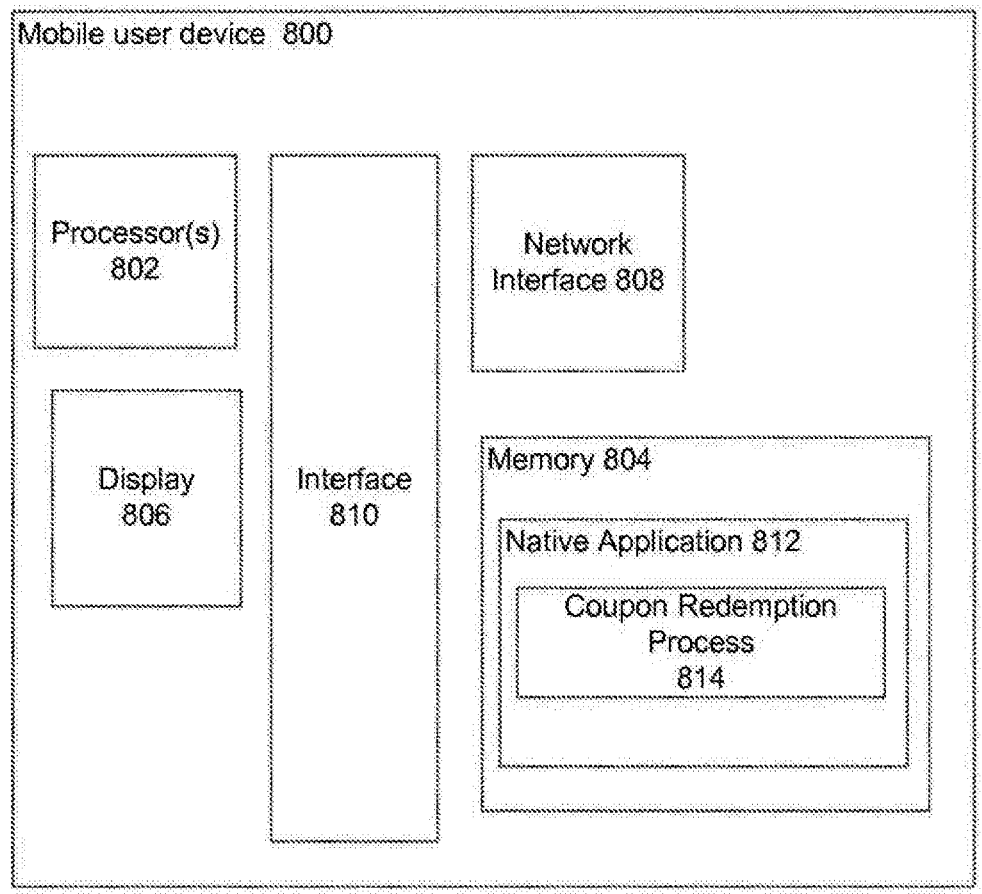
FIG. 8 is a block diagram of a mobile user device in accordance with an embodiment of the present invention.

FIG. 8 depicts a mobile user device 800 in accordance with an embodiment of the present invention. Various sections of systems and computer-implemented methods described herein, may include or be executed on one or more computers similar to mobile user device 800. Further, processes and modules described herein may be executed by one or more processing systems similar to that of mobile user device 800. The mobile user device 800 may include various internal and external components that contribute to the function of the device and which may allow the mobile user device 800 to function in accordance with the techniques discussed herein. It should further be noted that FIG. 8 depicts merely one example of a particular implementation and is intended to illustrate the types of components and functionalities that may be present in mobile user device 800.

Mobile user device 800 may include any combination of devices or software that may perform or otherwise provide for the performance of the techniques described herein. For example, mobile user device 800 may include a tablet, a mobile phone, such as a smartphone, a video game device, and other hand-held networked computing devices. Mobile user device 800 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the mobile user device 800 may allow a user to connect to and communicate through a network (e.g., the Internet, a local area network, a wide area network, etc.) and may provide communication over a satellite-based positioning system (e.g., GPS). For example, the mobile user device 800 may allow a user to communicate using e-mail, text messaging, instant messaging, or using other forms of electronic communication, and may allow a user to obtain the location of the device from the satellite-based positioning system, such as the location on an interactive map.

As shown in FIG. 8, the mobile user device 800 may include a processor 802 (e.g., one or more processors) coupled to a memory 804, a display 806, and a network interface 808 via an interface 810. It should be appreciated the mobile user device 800 may include other components not shown in FIG. 8, such as a power source (e.g., a battery), I/O ports, expansion card interfaces, hardware buttons, etc. In some embodiments, the display 806 may include a liquid crystal display (LCD) or an organic light emitting diode (OLED) display. The display 806 may display a user interface (e.g., a graphical user interface), and may also display various function and system indicators to provide feedback to a user, such as power status, call status, memory status, etc. These indicators may be in incorporated into the user interface displayed on the display 806. In accordance with some embodiments, the display 806 may include or be provided in conjunction with touch sensitive elements through which a user may interact with the user interface. Such a touch-sensitive display may be referred to as a "touchscreen" and may also be known as or called a touch-sensitive display. Thus, in such embodiments, a user interface may provide for interaction via touch-sensitive elements of the display 806. In such an embodiment, the display 806 may include a capacitive touchscreen, a resistive touchscreen, or any other suitable touchscreen technology.

The processor 802 may provide the processing capability required to execute the operating system, programs, user interface, and any functions of the mobile user device 800. The processor 802 may include one or more processors that may include "general-purpose" microprocessors and special purpose microprocessors, such as one or more reduced instruction set (RISC) processors, such as those implementing the Advanced RISC Machine (ARM) instruction set. Additionally, the processor 802 may include single-core processors and multicore processors and may include graphics processors, video processors, and related chip sets. A processor may receive instructions and data from a memory (e.g., system memory 804). Processes, such as those described herein may be performed by one or more programmable processors executing computer code to perform functions by operating on input data and generating corresponding output.

The memory 804 (which may include tangible non-transitory computer readable storage mediums) may include volatile memory and non-volatile memory accessible by the processor 802 and other components of the mobile user device 800. The memory 804 may include volatile memory, such as random access memory (RAM), and non-volatile memory, such as ROM, flash memory, a hard drive, any other suitable optical, magnetic, or solid-state storage medium, or a combination thereof. The memory 804 may store a variety of information and may be used for a variety of purposes. For example, the memory 804 may store executable code, such as the firmware for the mobile user device 800, an operating system for the mobile user device 800, and any other programs. The executable computer code may include instructions executable by a processor, such as processor 802, and the computer may include instructions for implementing one or more techniques described herein with regard to various processes. For example, the memory 804 may store an executable native application 812 having a coupon redemption process 814, such as that described above. The executable native application 812 may enable a user to view offers, such as online coupons, and select and redeem online coupons using the user actions described above. The executable code may be written in a programming language, including compiled or interpreted languages, or declarative or procedural language, and may be composed into a unit suitable for use in a computing environment, including as a stand-alone program, a module, a component, a subroutine. Such code program may be stored in a section of a file that holds other programs or data (e.g., one or more scripts stored in a markup language document), in a single file dedicated to the program in question, or in multiple coordinated files (e.g., files that store one or more modules, sub programs, or sections of code). Additionally, the copies of the executable code may be stored in both non-volatile and volatile memories, such as in a non-volatile memory for long-term storage and a volatile memory during execution of the code.

The interface 810 may include multiple interfaces and may couple various components of the mobile user device 800 to the processor 802 and memory 804. In some embodiments, the interface 810, the processor 802, memory 804, and one or more other components of the mobile user device 800 may be implemented on a single chip, such as a system-on-a-chip (SOC). In other embodiments, these components, their functionalities, or both may be implemented on separate chips. The interface 810 may be configured to coordinate I/O traffic between processor 802, memory 804, network interface 806, and other internal and external components of the mobile user device 800. The interface 810 may include functionality for interfacing via various types of peripheral buses, such as a variant of the Peripheral Component Interconnect (PCI) bus standard, the Universal Serial Bus (USB) standard, and the like.

The mobile user device 800 depicted in FIG. 8 also includes a network interface 808, such as a wired network interface, wireless (e.g., radio frequency) receivers, etc. For example, the network interface 808 may receive and send electromagnetic signals and communicate with communications networks and other communications devices via the electromagnetic signals. The network interface 808 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 804 may communicate with networks (e.g., network XXX), such as the Internet, an intranet, a cellular telephone network, a wireless local area network (LAN), a metropolitan area network (MAN), or other devices by wireless communication. The network interface 808 may suitable any suitable communications standard, protocol and technology, including Ethernet, Global System for Mobile Communications (GSM), Enhanced Data GSM Environment (EDGE), a 4G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocol. In some embodiments, for example, the native application 810 may be transmitted to the mobile user device 800 over a network via the network interface 808. Additionally, a user may use the native application 810 to retrieve online coupons and view web content received via the network interface 808.

Those skilled in the art will also appreciate that, while various items are illustrated as being stored in memory or on storage while being used, these items or sections of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-readable medium or a portable article to be read by an appropriate drive, various examples of which are described above. In some embodiments, instructions stored on a computer-readable medium separate from mobile user device 800 may be transmitted to mobile user device 800 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method comprising:
generating an application programming interface request to retrieve content configured for a native application executing on a mobile user device;
rendering within an interface of the native application at least one user interface element corresponding to respective ones of a plurality of content items received based on the request, each content item in the plurality of content items associated with a given external website in a plurality of websites to which at least some content of the corresponding content item is operable as input to the given external website;
receiving with the native application a user selection of a given one of the user interface elements corresponding to a respective content item in the plurality of content items;
obtaining, with the native application responsive to the user selection of the given user interface element, at least one webpage of the external website associated with the content item;
rendering, with the native application, a first interface portion of the interface comprising a user interface element indicative of the content of the content item operable as input to the external website;
instantiating, with the native application, a browser instance, the browser instance rendering within a second user interface portion of the interface the webpage of the external website, the webpage comprising a plurality of webpage elements, at least some of the plurality web page elements being input fields operative to receive input, and a given one of the at least some webpage elements including an input field operative to receive the content of the content item operable as input to the external website, the first interface portion being displayed concurrently with the second user interface portion;
receiving a touch on a touchscreen of the mobile user device at a first location having a first set of coordinates on the touchscreen corresponding to the user interface element indicative of the content of the content item;

receiving a gesture on the touchscreen, the gesture comprising a movement from the first location to a second location on the touchscreen;

executing, by a processor of the mobile user device, a visual movement of the user interface element indicative of the content of the content item from the first location to the second location along a path coincident with the gesture;

receiving a release of the touch at the second location with an event handler of the native application, the event handler determining a second set of coordinates on the touchscreen indicating where the touch was released;

selecting an input field from among the at least some webpage elements of the webpage, wherein selecting the input field from among the at least some webpage elements comprises:

determining, based on a document object model of the webpage, a location of at least one of the at least some webpage elements within the rendered version of the webpage being displayed within the second user interface portion;

determining, based on the location of the webpage element within the rendered version of the webpage within the second user interface portion, a set of touchscreen display coordinates for the webpage element, the set of touchscreen display coordinates for the webpage element indicating a displayed location of the webpage element on the touchscreen;

calculating a touchscreen display distance between the second set of coordinates on the touchscreen indicating where the touch was released and the set of touchscreen display coordinates for the webpage element; and determining that a document object model element of the webpage including an input field is selected by the touch release based on the touchscreen display distance; and setting the input field of the document object model element of the webpage determined to be selected to a value corresponding to the content of the content item.

2. The method of claim 1, wherein selecting the input field from among the at least some webpage elements further comprises obtaining offsetTop and offsetLeft attributes of the at least one of webpage element from the document object model of the webpage, wherein:

the location of the webpage element within the rendered version of the webpage being displayed within the second user interface portion is determined based on the offsetTop and offsetLeft attributes, and calculating the touchscreen display distance comprises calculating a distance between the location on the touchscreen based on the offsetTop and offsetLeft attributes and the second set of coordinates on the touchscreen indicating where the touch was released.

3. The method of claim 1, wherein selecting the input field from among the at least some webpage elements further comprises:

generating, based on the document object model of the webpage, an inventory of the at least some of the plurality of webpage elements having a text input type; and determining, for each of the webpage elements in the inventory, offsetTop and offsetLeft attributes, and wherein calculating the touchscreen display distance comprises calculating a distance between a location on the touchscreen based on the offsetTop and offsetLeft attributes and the second set of coordinates on the touchscreen indicating where the touch was released.

4. The method of claim 1, wherein selecting the input field from among the at least some webpage elements further comprises:

generating an inventory of text input document object model elements of the webpage;

generating an inventory of offsetTop and offsetLeft coordinates of the text input document object mode elements; and selecting the text input from among the inventory based on correspondence between an offsetTop and offsetLeft coordinate of the selected text input and the second location.

5. The method of claim 1, wherein setting the input field of the document object model element of the webpage determined to be selected to a value corresponding to the content of the content item comprises:

changing, within the document object model, a value attribute of the selected element of the webpage element having an text input field to the value corresponding to the content, wherein:

the content is alphanumeric text, and the browser instance renders within the second user interface portion of the interface the selected element of the webpage with the alphanumeric text responsive to the changing of the value attribute within the document object model.

6. The method of claim 1, wherein executing a visual movement of the user interface element indicative of the content of the content item from the first location to the second location along a path coincident with the gesture comprises animating the visual movement of the user interface element from the first location to the second location.

7. The method of claim 6, wherein animating the visual movement of the user interface element from the first location to the second location comprises:

determining a first speed of movement of the user interface element across the touchscreen based on a first position of the user interface element along the path coincident with the gesture; and determining a second speed of movement of the user interface element across the touchscreen based on a second position of the user interface element along the path coincident with the gesture, wherein the first speed is different from the second speed.

8. The method of claim 6, wherein animating the visual movement of the user interface element from the first location to the second location comprises:

distorting the user interface element by concurrently displaying translations of different parts of the coupon code over different distances over the touchscreen.

9. The method of claim 6, wherein animating the visual movement of the user interface element from the first location to the second location comprises:

animating a change in size of the visual representation of the coupon code along at least part of the path coincident with the gesture from the first location to the second location.

10. The method of claim 6, wherein animating the visual movement of the user interface element from the first location to the second location comprises:

animated a damped oscillation of the visual representation of the coupon code at the second location.

11. The method of claim 6, wherein animating the visual movement of the user interface element from the first location to the second location comprises:

calculating a skew transform of increasing severity based on a translation of a first corner initially faster than a second corner of the user interface element over some duration of the gesture alone the path coincident with the gesture; and rendering the user interface element based on the skew transform.

12. The method of claim 1, wherein:
generating an application programming interface request to retrieve content configured for a native application executing on a mobile user device comprises:
sending the request to a remote publisher server,
the request identifying a user account having data acquired via multiple user devices, and
at least some of the plurality of content items received based on the request being selected based on user interactions occurring on different user devices among the multiple user devices.

13. The method of claim 1, wherein receiving a release of the touch at the second location with an event handler of the native application, the event handler determining a second set of coordinates on the touchscreen indicating where the touch was released, comprises:
detecting a first touch event within the first interface portion corresponding to the user interface element; and
detecting a second touch event corresponding to the release of the touch within the second interface portion.

14. A non-transitory computer-readable medium having executable computer code stored thereon, the executable computer code comprising instructions that, when executed, cause one or more processors to perform operations comprising:
generating an application programming interface request to retrieve content configured for a native application executing on a mobile user device;
rendering within an interface of the native application at least one user interface element corresponding to respective ones of a plurality of content items received based on the request, each content item in the plurality of content items associated with a given external website in a plurality of websites to which at least some content of the corresponding content item is operable as input to the given external website;
receiving with the native application a user selection of a given one of the user interface elements corresponding to a respective content item in the plurality of content items;
obtaining, with the native application responsive to the user selection of the given user interface element, at least one webpage of the external website associated with the content item;
rendering, with the native application, a first interface portion of the interface comprising a user interface element indicative of the content of the content item operable as input to the external website;
instantiating, with the native application, a browser instance, the browser instance rendering within a second user interface portion of the interface the webpage of the external website, the webpage comprising a plurality of webpage elements, at least some of the plurality of webpage elements being input fields operative to receive input, and a given one of the at least some webpage elements including an input field operative to receive the content of the content item operable as input to the external website, the first interface portion being displayed concurrently with the second user interface portion;
receiving a touch on a touchscreen of the mobile user device at a first location having a first set of coordinates on the touchscreen corresponding to the user interface element indicative of the content of the content item;
receiving a gesture on the touchscreen, the gesture comprising a movement from the first location to a second location on the touchscreen;
executing, by a processor of the mobile user device, a visual movement of the user interface element indicative of the content of the content item from the first location to the second location along a path coincident with the gesture;
receiving a release of the touch at the second location with an event handler of the native application, the event handler determining a second set of coordinates on the touchscreen indicating where the touch was released;
selecting an input field from among the at least some webpage elements of the webpage, wherein selecting the input field from among the at least some webpage elements comprises:
determining, based on a document object model of the webpage, a location of at least one of the at least some webpage elements within the rendered version of the webpage being displayed within the second user interface portion;
determining, based on the location of the webpage element within the rendered version of the webpage within the second user interface portion, a set of touchscreen display coordinates for the webpage element, the set of touchscreen display coordinates for the webpage element indicating a displayed location of the webpage element on the touchscreen;
calculating a touchscreen display distance between the second set of coordinates on the touchscreen indicating where the touch was released and the set of touchscreen display coordinates for the webpage element; and
determining that a document object model element of the webpage including an input field is selected by the touch release based on the touchscreen display distance; and
setting the input field of the document object model element of the webpage determined to be selected to a value corresponding to the content of the content item.

15. The medium of claim 14, wherein selecting the input field from among the at least some webpage elements further comprises obtaining offsetTop and offsetLeft attributes of the at least one of webpage element from the document object model of the webpage, wherein:
the location of the webpage element within the rendered version of the webpage being displayed within the second user interface portion is determined based on the offsetTop and offsetLeft attributes, and
calculating the touchscreen display distance comprises calculating a distance between the location on the touchscreen based on the offsetTop and offsetLeft attributes and the second set of coordinates on the touchscreen indicating where the touch was released.

16. The medium of claim 14, wherein selecting the input field from among the at least some webpage elements further comprises:

generating, based on the document object model of the webpage, an inventory of the at least some of the plurality of webpage elements having a text input type; and determining, for each of the webpage elements in the inventory, offsetTop and offsetLeft attributes, and wherein calculating the touchscreen display distance comprises calculating a distance between a location on the touchscreen based on the offsetTop and offsetLeft attributes and the second set of coordinates on the touchscreen indicating where the touch was released.

17. The medium of claim 14, wherein selecting the input field from among the at least some webpage elements further comprises:

generating an inventory of text input document object model elements of the webpage;

generating an inventory of offsetTop and offsetLeft coordinates of the text input document object mode elements; and selecting the text input from among the inventory based on correspondence between an offsetTop and offsetLeft coordinate of the selected text input and the second location.

18. The medium of claim 14, wherein setting the input field of the document object model element of the webpage determined to be selected to a value corresponding to the content of the content item comprises:

changing, within the document object model, a value attribute of the selected element of the webpage element having a text input field to the value corresponding to the content, wherein:

the content is alphanumeric text, and the browser instance renders within the second user interface portion of the interface the selected element of the webpage with the alphanumeric text responsive to the changing of the value attribute within the document object model.

19. The medium of claim 14, wherein:

generating an application programming interface request to retrieve content configured for a native application executing on a mobile user device comprises:

sending the request to a remote publisher server, the request identifying a user account having data acquired via multiple user devices, and at least some of the plurality of content items received based on the request being selected based on user interactions occurring on different user devices among the multiple user devices.

20. The medium of claim 14, wherein receiving a release of the touch at the second location with an event handler of the native application, the event handler determining a second set of coordinates on the touchscreen indicating where the touch was released, comprises:

detecting a first touch event within the first interface portion corresponding to the user interface element; and detecting a second touch event corresponding to the release of the touch within the second interface portion.

* * * * *